Sept. 7, 1926.

H. CARLE 1,598,710

MACHINE FOR MAKING CONTAINERS

Original Filed March 25, 1921  11 Sheets-Sheet 1

INVENTOR
H. Carle
BY
Duell, Warfield & Duell
ATTORNEY

Sept. 7, 1926.

H. CARLE 1,598,710

MACHINE FOR MAKING CONTAINERS

Original Filed March 25, 1921  11 Sheets-Sheet 2

INVENTOR
H. Carle
BY
ATTORNEY

Sept. 7, 1926.                                                          1,598,710
                              H. CARLE
                      MACHINE FOR MAKING CONTAINERS
                  Original Filed March 25, 1921    11 Sheets-Sheet 3

INVENTOR
H. Carle
BY
Duell, Warfield & Duell
ATTORNEY

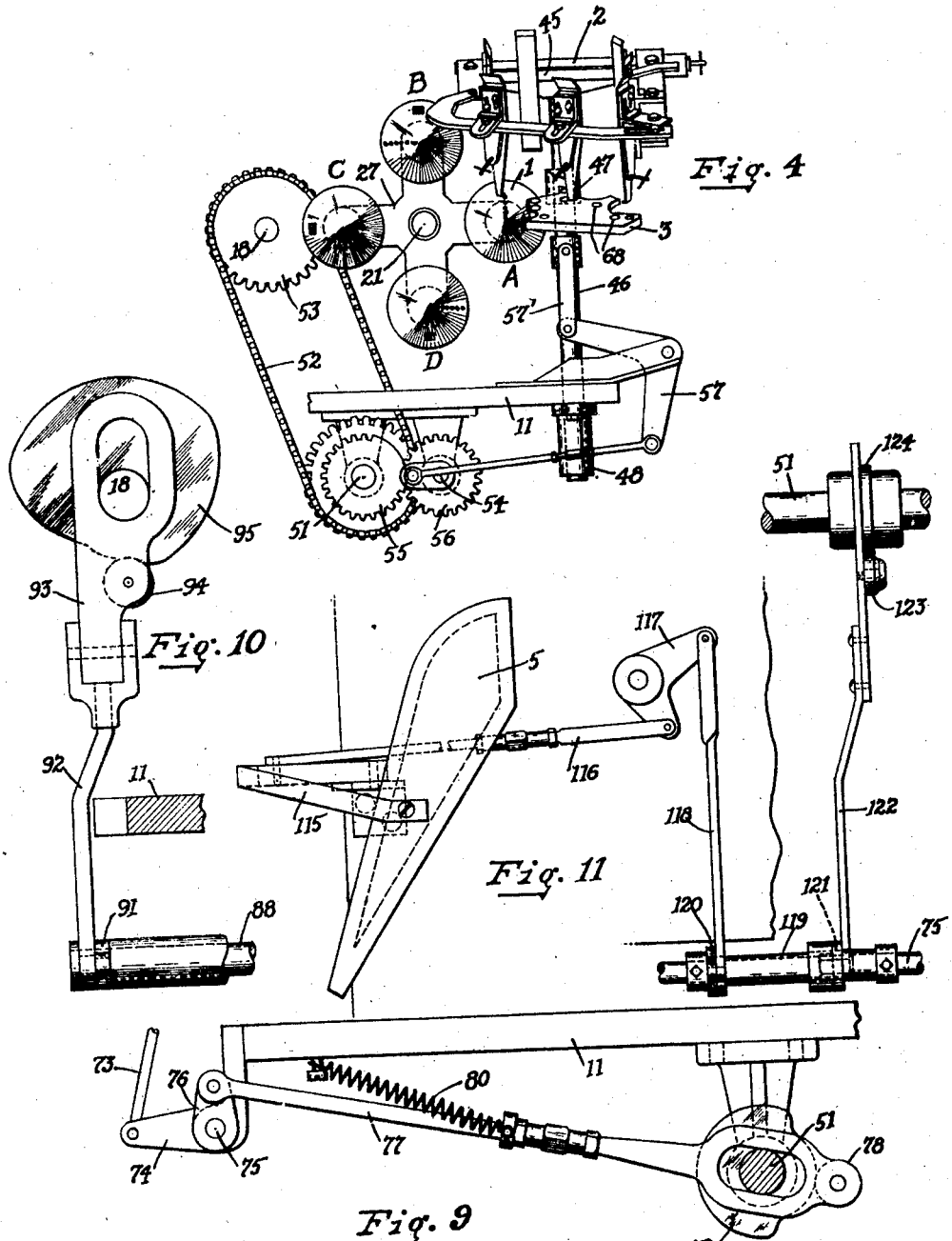

Sept. 7, 1926.  H. CARLE  1,598,710
MACHINE FOR MAKING CONTAINERS
Original Filed March 25, 1921  11 Sheets-Sheet 5
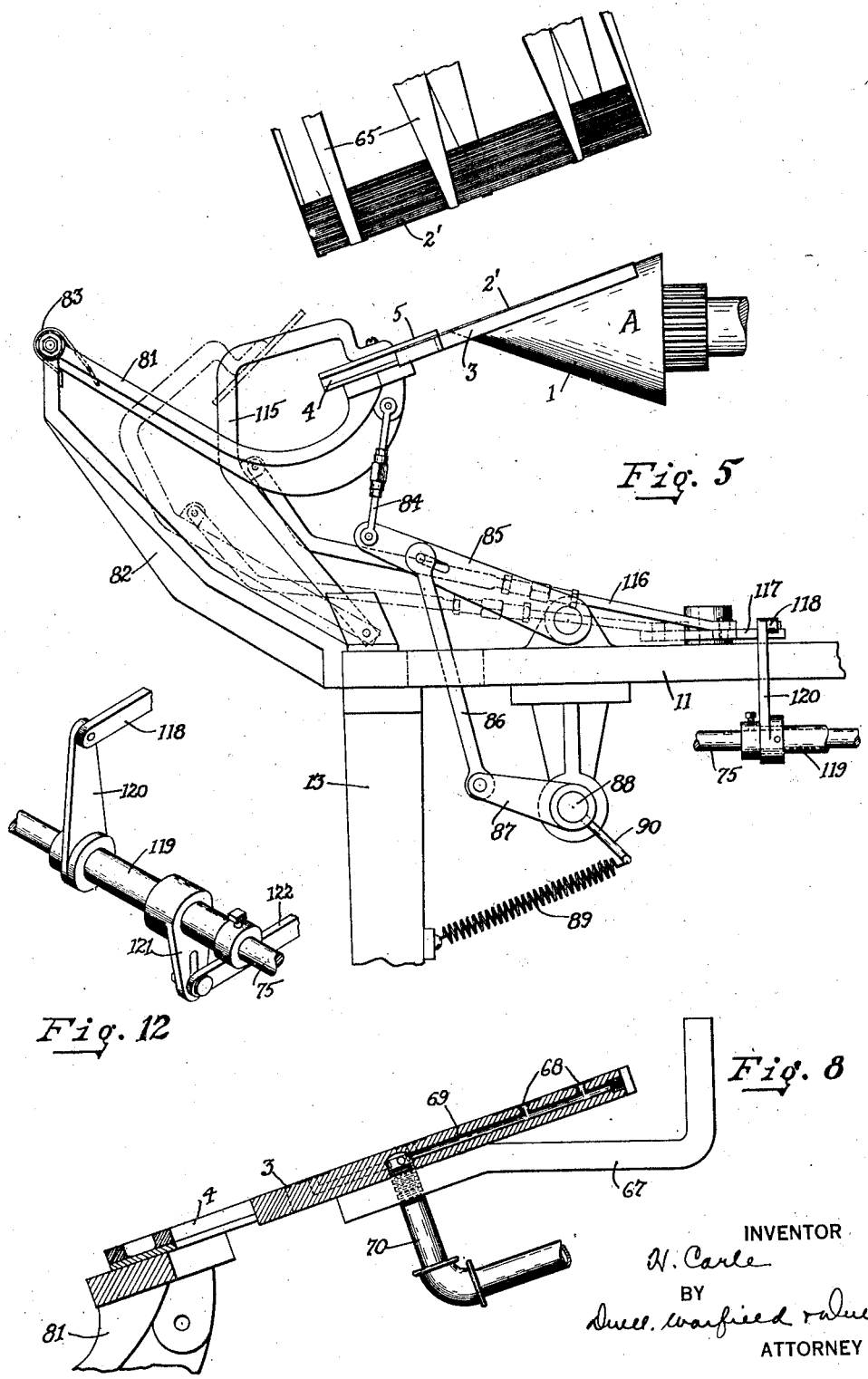

Sept. 7, 1926.                                      1,598,710
                     H. CARLE
            MACHINE FOR MAKING CONTAINERS
       Original Filed March 25, 1921    11 Sheets-Sheet 6
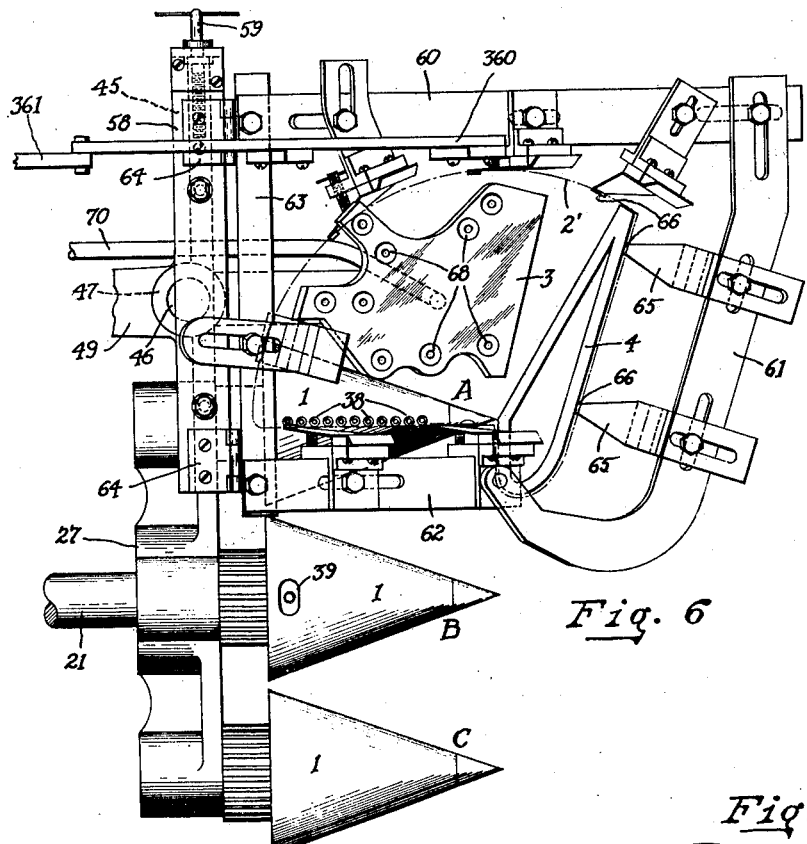
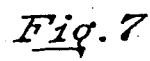
Fig. 6
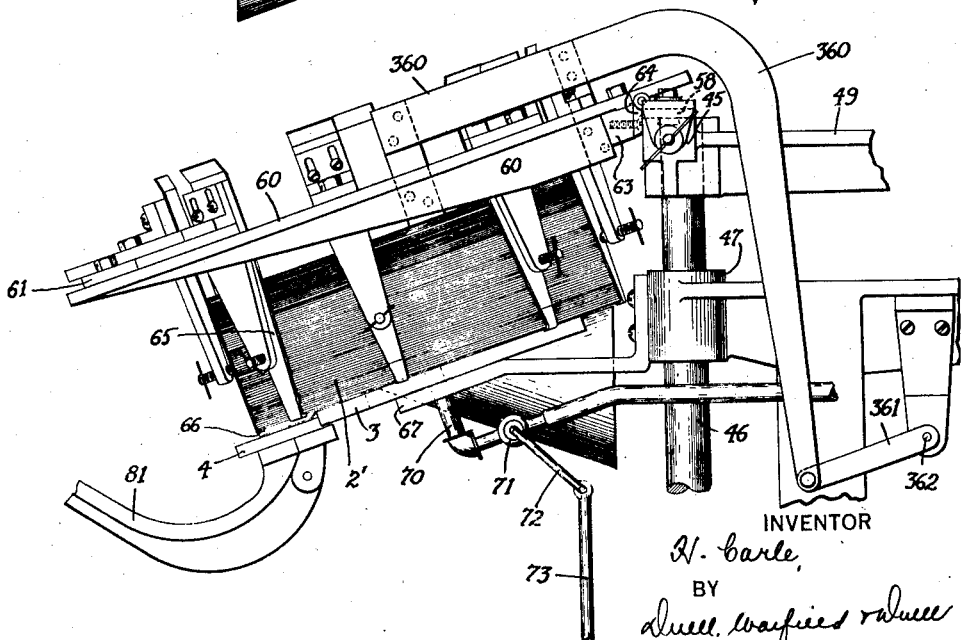
Fig. 7
INVENTOR
H. Carle,
BY
Duell, Warfield & Duell
ATTORNEY Sept. 7, 1926. 1,598,710
H. CARLE
MACHINE FOR MAKING CONTAINERS
Original Filed March 25, 1921 11 Sheets-Sheet 7
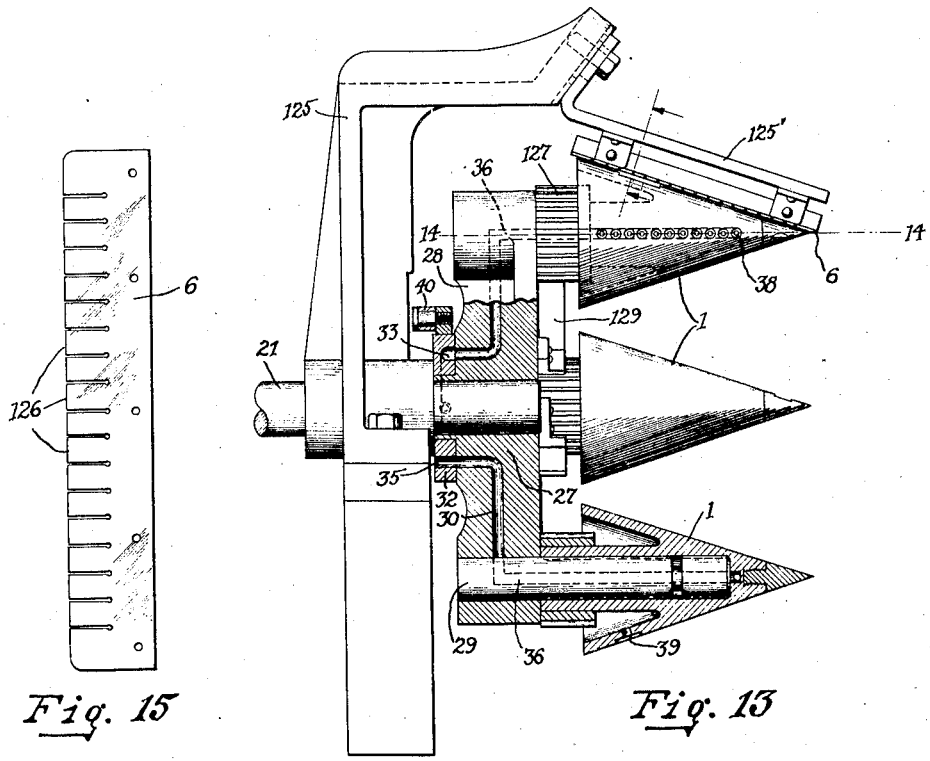
Fig. 13
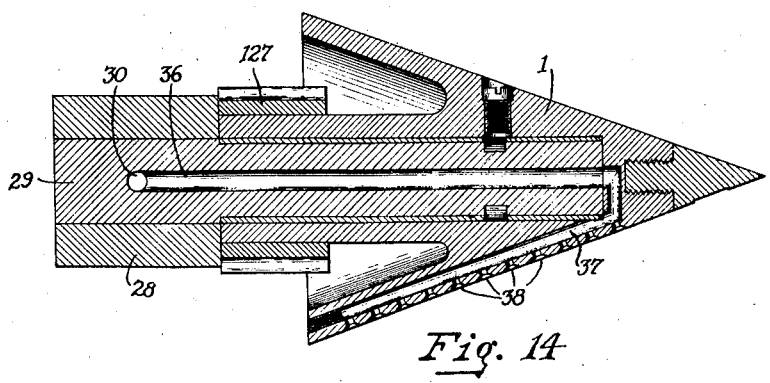
Fig. 14
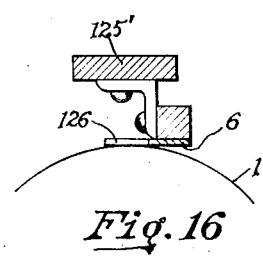
Fig. 15
Fig. 16
INVENTOR
N. Carle
BY
ATTORNEY Sept. 7, 1926.
H. CARLE
1,598,710
MACHINE FOR MAKING CONTAINERS
Original Filed March 25, 1921 11 Sheets-Sheet 8
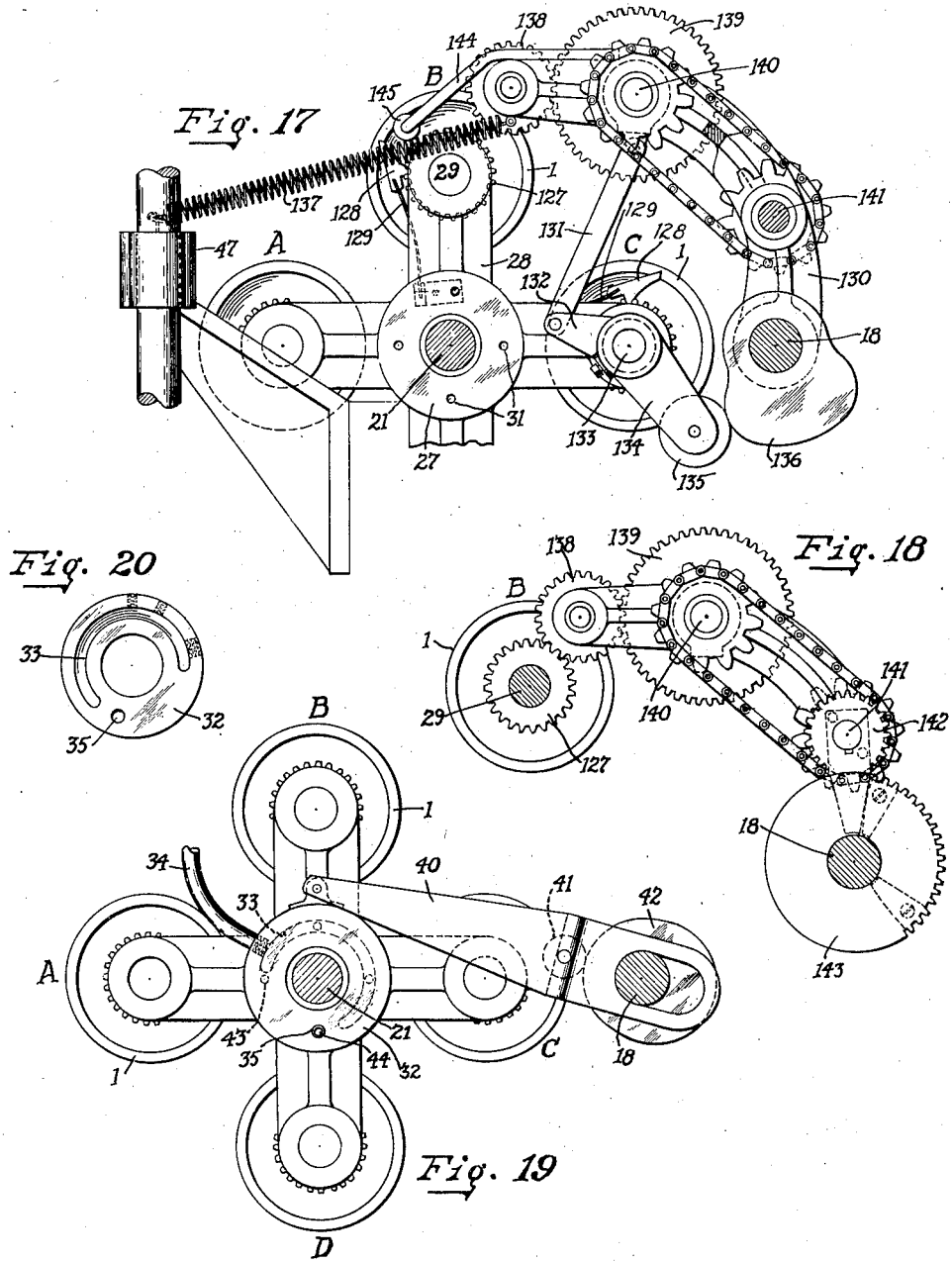

Sept. 7, 1926.

H. CARLE 1,598,710

MACHINE FOR MAKING CONTAINERS

Original Filed March 25, 1921     11 Sheets-Sheet 9

INVENTOR
H. Carle
BY
Duell, Warfield & Duell.
ATTORNEY

Sept. 7, 1926.

H. CARLE 1,598,710

MACHINE FOR MAKING CONTAINERS

Original Filed March 25, 1921    11 Sheets-Sheet 10

INVENTOR
H. Carle
BY
Duell, Warfield & Duell
ATTORNEY

Sept. 7, 1926.

H. CARLE 1,598,710

MACHINE FOR MAKING CONTAINERS

Original Filed March 25, 1921   11 Sheets-Sheet 11

INVENTOR
H. Carle
BY
ATTORNEY

Patented Sept. 7, 1926.

1,598,710

UNITED STATES PATENT OFFICE.

HAROLD CARLE, OF BUFFALO, NEW YORK, ASSIGNOR, BY MESNE ASSIGNMENTS, TO VORTEX MFG. CO., OF CHICAGO, ILLINOIS, A CORPORATION OF ILLINOIS.

MACHINE FOR MAKING CONTAINERS.

Application filed March 25, 1921, Serial No. 455,480. Renewed July 12, 1926.

This invention relates to a machine for making receptacles such as, for example, conical cups, and aims to provide a device of this character presenting certain improvements over machines heretofore utilized for similar purposes.

It is an object of this invention to provide a machine of the character stated which is structurally superior and functionally advantageous.

It is a further object of the present invention to construct a machine which will operate to form receptacles constructed of paper or similar material, which receptacles will embody sufficient rigidity for all practical purposes and in which, furthermore, a fluid-tight seal will be incorporated.

A still further object of the invention is to be predicated to the provision of a machine, the functions of which will be automatic so that a minimum of attendants will be required and consequently permit of the articles manufactured thereby being constructed at a nominal figure.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings forming part of this specification in which similar reference characters refer to similar parts throughout the several views,—

Fig. 4 is a fragmentary elevation of the blank magazine and its operating devices;

Fig. 5 is an elevation of parts adjacent the first station;

Fig. 6 is a plan view of the blank magazine and the supporting plate;

Fig. 7 is a similar elevation;

Fig. 8 is a sectional view of the supporting plate and the glue pad;

Fig. 9 is a detail of the devices for operating the supporting plate valve;

Fig. 10 is a detail of the devices for controlling the motion of the glue pad;

Fig. 11 is a top view of the press plate and its operating mechanism;

Fig. 12 is a detail in perspective of part of the same mechanism;

Fig. 13 is an elevation, partly in section, of the turret head and adjacent parts;

Fig. 14 is a section taken on the line 14—14 of Fig. 13;

Fig. 15 is a detail of the pressure plate;

Fig. 16 is a cross section of the pressure plate and adjacent parts;

Fig. 17 is a fragmentary elevation of the former-rotating mechanism;

Fig. 18 is a supplementary detail;

Fig. 19 is a fragmentary elevation of the devices for oscillating the vacuum plate;

Fig. 20 is a back face view of the vacuum plate;

Figure 1:
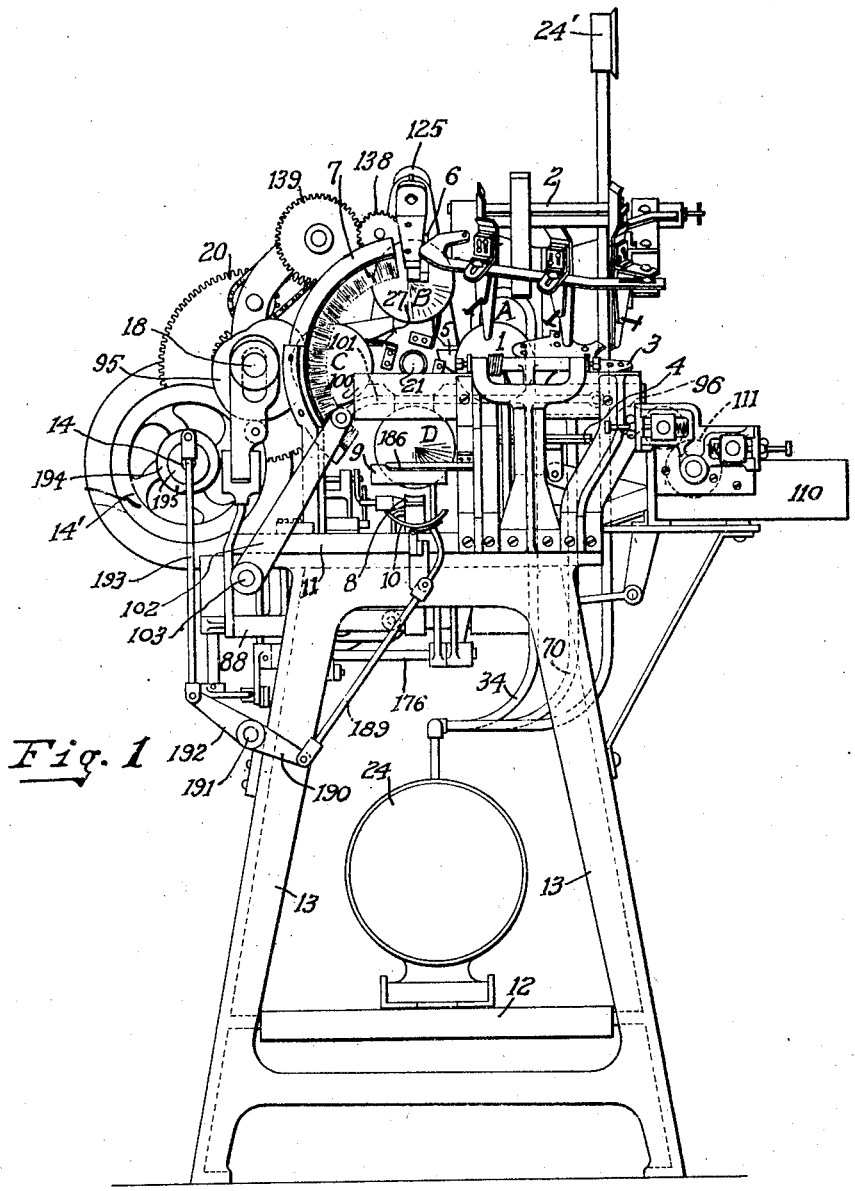
Figure 1 is an elevation of a machine embodying the invention, certain parts being omitted for clearness.
Figure 2:
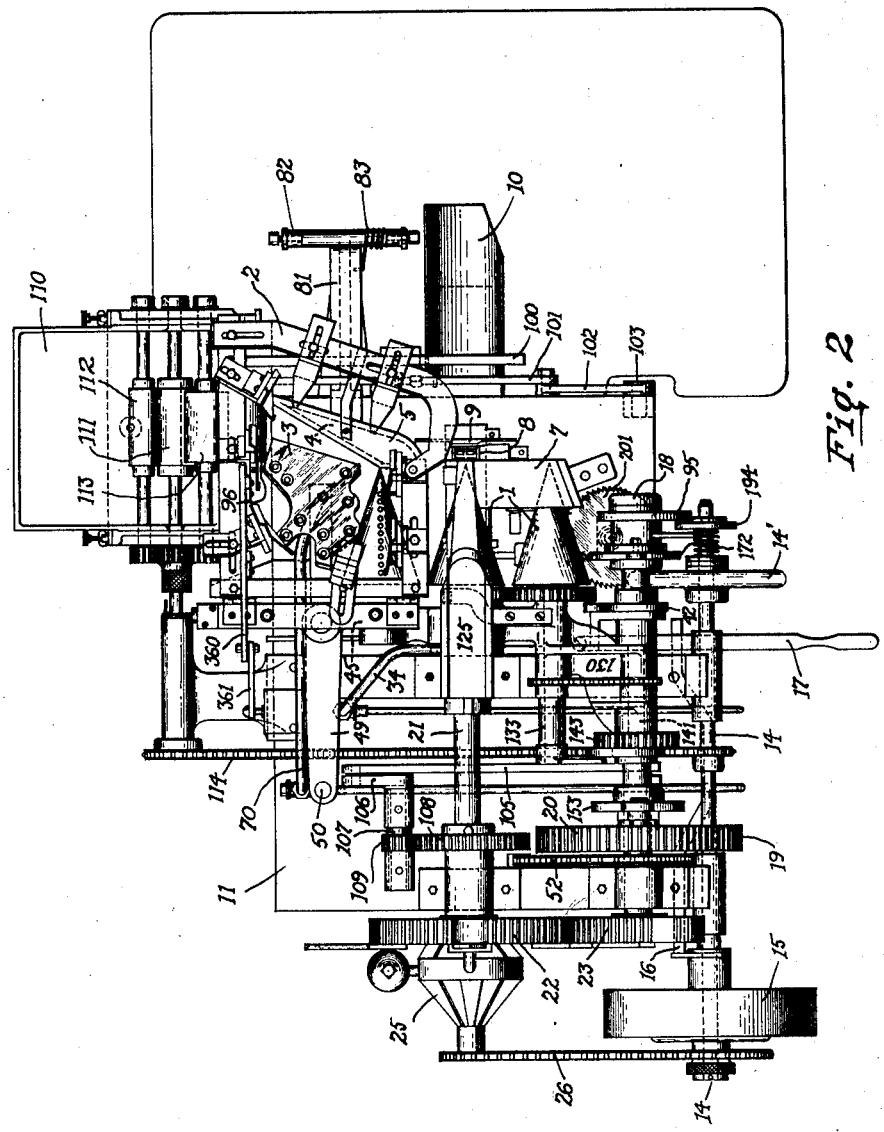
Fig. 2 is a similar plan view.
Figure 3:
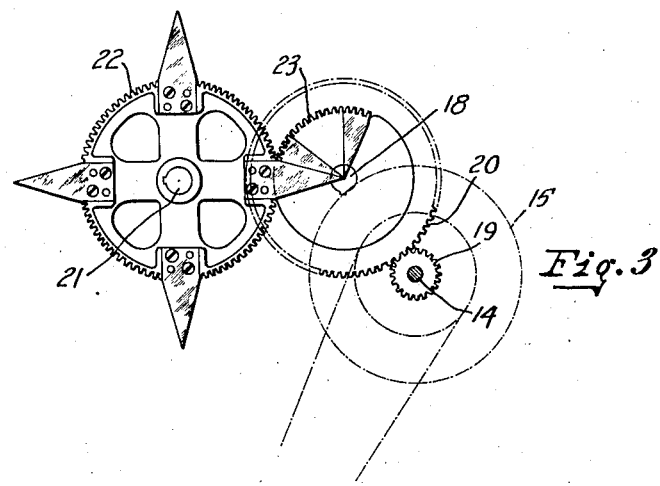
Fig. 3 is a fragmentary elevation of the driving mechanism.

In the present embodiment of the invention, a machine is provided which incorporates mechanism adapted to coil a paper blank to form a perfect cone and in such forming to provide a rigid article; to automatically apply glue to a sector-shaped blank for shaping the blank about a former into a perfect cone; for pressing the article so formed to insure the provision of a cone having a dependable water-tight apex; for positioning a blank in exact relationship to a former and to a gluer so that a predetermined portion of the blank will lie against the former and another portion of the blank will assume an exactly predetermined position against the gluer; for holding the blank in the predetermined position mentioned against the gluer and the former while the blank is being stripped from the magazine; for so securing the blank in a condition substantially free from curves or bends by providing a plane supporting surface for the major portion of the blank; for firmly pressing the glued area of the blank against the gluer to obtain sufficient application of glue to the blank and to cause adherence between the gluer and the blank sufficient to effect a stripping of the glued area from the magazine upon movement of the gluer; for effecting a sure pneumatic grip of the blanks to the former to prevent any slip during the operation of coiling the blanks about the former; for obtaining a strong gripping effect to the supporting plate in the operation of feeding the blanks; for effecting a partial coiling of the blanks on the former while a major portion of the blanks trails from the former in generally flat condition; for resisting the tendency of the former presser to wipe the blank from its position on the former and before and during the rotation of the former which completes the coiling; for pressing the blank against the former after coiling during a partial setting of the adhesive to insure permanency, and for discharging the formed cones in stacks containing a predetermined number of reliable cones.

The machine illustrated employs a feeding device which includes a blank magazine carrying a pack of previously cut blanks but it will be understood that the invention, viewed in some aspects, permits the employment of a continuous web from which the blanks may be automatically cut and supplied to the formers.

The following main elements are employed in the present embodiment: Conical formers 1 about which the blanks are formed, a blank magazine 2 for holding a pack of blanks 2', a vacuum plate 3 and a glue pad 4 for removing a blank from the pack, a press plate 5 for spreading the glue evenly over a portion 4' of the blank, a pressure spring plate 6 against which the blank is coiled upon rotation of the former, a brush 7 for ironing the formed cone, a stripper 8 for removing cones from the former, a cup pusher 9 for ejecting the cones from the stripper and a pan or receptacle 10 for receiving the cones as discharged.

The various devices employed in the present embodiment are supported upon or by a table comprising a horizontal platform 11 and braces 12 held at convenient heights by legs 13. It will be conducive to a clear understanding of the operation of the machine to describe at this point the character and arrangement of the main driving mechanism. A horizontal drive shaft 14 is journaled in suitable bearings held by brackets mounted on the table and may be rotated from the belt wheel 15 and controlled by a clutch shifter 16 operated by a conveniently disposed hand lever 17. An auxiliary horizontal shaft 18, hereafter called the "cam shaft", supported by the table, is continuously driven by the shaft 14 by means of enmeshing gears 19 and 20. A horizontal central shaft 21 is intermittently rotated by the shaft 18 by means of the Geneva gearing 22 and 23. An air exhaust tank 24 which may have a pressure 24' connected with it, is supported by the bracket or brace 12 beneath the table and a rotary exhaust pump 25 therefor is operated by means of a chain 26 co-operating with a sprocket on the drive shaft 14. Evidently during rotation of the shaft 14 continuous rotation will be imparted to the cam shaft 18 and to the shaft of the pump 25 while the central shaft 21 will be intermittently rotated from shaft 18. A hand wheel 14' may be conveniently fixed to shaft 14 as shown in the drawings.

The various operations of forming conical cups are focused about a turret head 27 which is keyed to the shaft 21 for intermittent rotation therewith, and which carries a plurality of radial arms 28, in the present instance four. Each arm 28 is provided with a stud or bearing 29 projecting perpendicularly therefrom upon which conical formers 1, each having one or more pneumatic gripper openings in its curved surface, are rotatably mounted. As illustrated best in Figs. 13, 14, 17, 19, and 20, air channels 30 are drilled through the arms 28 and terminate in apertures 31 on the back face of the turret head. A vacuum plate 32 is loosely mounted on the shaft 21 against the back face of the turret head and has a groove or air channel 33 adapted to register with the apertures 31. A flexible pipe 34 communicating with the air channel 33 leads to the air exhaust tank 24. A hole 35 is drilled through the plate 32 and is adapted to register with one of the apertures 31 in the turret head at a certain position of the plate 32. Each of the studs 29 is provided with an air channel 36 in direct communication with the air channel 30 of the turret head. Upon the stud 29 is rotatably mounted a conical metal former 1 which has an air channel 37 in communication with the air channel 36 and terminating in pneumatic gripper openings or apertures 38 on the surface of the former and along an element thereof. The cone 1 is hollow for a portion of its length and a depression 39 is cut in the surface of the cone from which a passageway leads through the shell to provide an independent atmospheric opening in the surface of the former, the function of which will be explained hereinafter. Obviously, direct communication will be allowed at all times between the pneumatic gripper openings in the former and the apertures in the back face of the turret head by way of the air passageway. The formers, as shown, are very small at their outer ends, terminating in a point, substantially, and are adapted to support a conical cup in telescopic relation therewith and are subject to rotation on their supporting studs and to translation periodically from one station of rest to another in an arcuate path by reason of the eccentric position of the studs as the head is intermittently rotated.

Referring now more particularly to Fig. 19 the vacuum plate 32 is adapted to be oscillated by an arm 40 which carries a roller 41 bearing against a cam 42 on the cam shaft 18. At the position shown in Fig. 19 the air channel 33 of the vacuum plate is cut off from communication with one of the apertures 31 in the back face of the turret head while the hole 35 registers with another of said apertures of the turret head. These two apertures are indicated by the numerals 43 and 44 respectively in the drawing. Upon movement of the arm 40 toward the left in Fig. 19 communication will be established between the air channel 33 and the aperture 43 while communication between the hole 35 and the aperture 44 will be broken.

The operation of the various mechanisms adjacent station A (see Figs. 1 to 6) concern generally the feeding and affixing of a single substantially sector-shaped blank to the conical former 1 in exactly determined relationship thereto and the gluing of a portion of the blank over the area 4', (Fig. 30), which is to form the sealing surface in the coiling of the cone. As shown most clearly in Figs. 4, 6 and 7 means are provided to apply a pack of blanks to a stationary supporting plate 3, having pneumatic gripper openings 68 in its surface, and lying in an inclined plane, as shown, its surface being generally in the plane of the upper element of the conical former at station A, which element contains the pneumatic gripper openings 38 of the former.

In the embodiment illustrated the blank applying means comprise a reciprocatory blank carrier, or magazine, movable in a plane generally normal to the supporting plate and to the former and operating to apply and remove a pack of blanks. The magazine descends far enough to allow the weight of the pack to be supported by the stationary plate so that the end blank of the pack will be surely gripped by the plate and held, as will be described in detail, while the magazine recedes, thus effecting the feeding of a single blank. The blank magazine 2 includes a horizontal bar 45 by which the various supporting devices for the blanks are carried and depending from which is a vertical rod 46, adapted to reciprocate in brackets 47 and 48 held by the table. The bar 45 has an extension 49 (Fig. 2) which cooperates with a second similar vertically reciprocating rod 50 to assist in horizontally aligning the magazine carrier. Below the table 11 a horizontal stub shaft 51 is supported and is rotated continuously by means of a chain 52 cooperating with a sprocket 53 on cam shaft 18. The shaft 51 serves to rotate a similar shaft 54 by means of gears 55 and 56, and rotation of the shaft 54 rocks the bellcrank lever 57 pivotally held by a bracket on the table and operating through the agency of a link 57' to raise and lower the rod 46 to which bar 45 of the magazine is secured, thus effecting the approaching and receding movement of the magazine relative to the pack support. A block 58 (Fig. 6) is slidably carried by the bar 45 and lengthwise adjustment between the two is allowed by a thumb screw 59. The framework of the blank magazine comprises members 60, 61 and 62 which are secured to a block 63 connected to the block 58 by hinges 64. As shown best in Fig. 7 the framework of the magazine will normally be held at an angle to the horizontal carrier, being allowed to swing down until the hinges 64 meet the blocks 45 and 58. When the pack of blanks 2' is delivered to the supporting plate 3 the framework of the magazine will be allowed a slight pivotal motion upward in respect to the carrier in a plane generally normal to the supporting plate by reason of the hinge connection between the two elements. A plurality of spring fingers 65 are carried by the framework of the magazine and various adjustments of the fingers are allowed so that the pack of blanks will be removably but reliably supported by the inturned tips 66 of the fingers in an inclined plane parallel to the plate 3. The downward motion of the blank magazine is sufficient to permit the pack of blanks to rest on the supporting plate 3 and the underlying portions of the fingers 65 are shaped to permit the weight of the pack to be transferred to the pack support.

The stationary supporting plate or blank gripper 3 may be held in position by a bracket 67 fixed to the bearing bracket 47 as shown and is provided with pneumatic gripper openings 68 (Figs. 6, 7 and 8) which communicate by air channels 69 with a pipe 70 in communication with the air exhaust tank 24. A valve 71 is included in pipe 70 and is adapted to be opened and closed periodically by the pin 72 operated by the link 73. As shown in Fig. 9 this link 73 is raised and lowered by an arm 74 keyed to the shaft 75. To this end, the shaft 75 is rocked by an arm 76 to which motion is imparted by a follower 77 carrying a roller 78 which bears against the surface of a cam 79 on shaft 51. A spring 80 serves to hold the roller closely against the cam.

Figure 30:
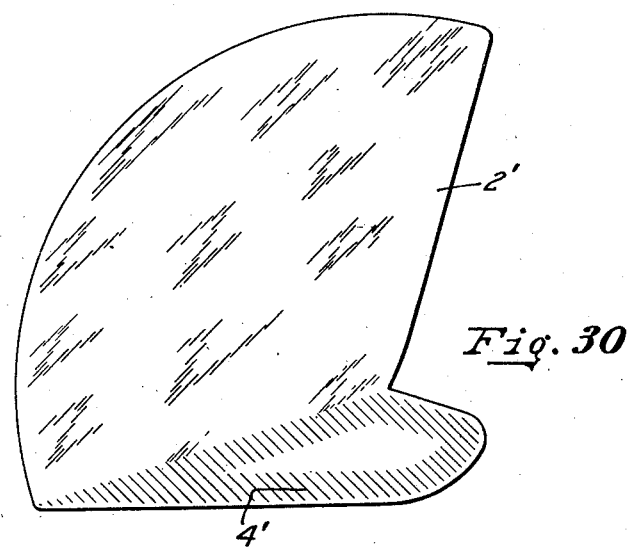
Fig. 30 is a plan view of one of the blanks.
Figure 28:
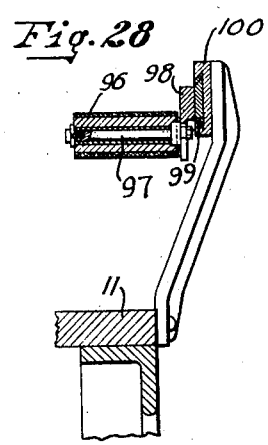
Fig. 28 is a section of the movable glue roller and slide.
Figure 29:
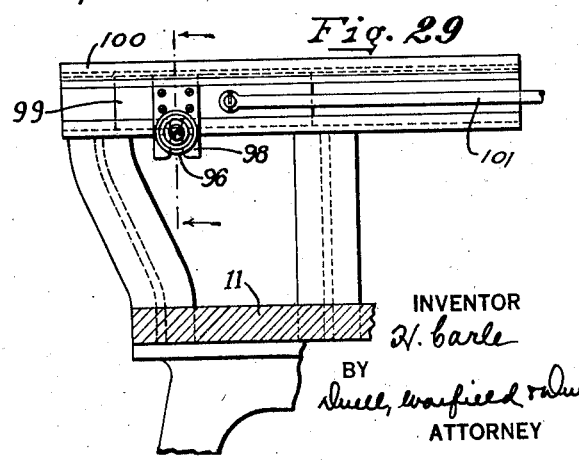
Fig. 29 is a rear elevation of the same.

In the present embodiment the means for stripping the blanks one by one from the magazine also includes a glue pad 4 having raised edges which are adapted to rest against a portion of a bottom blank held by the underlying tips of the fingers of the magazine and thus to apply glue to a roughly triangular area 4' (Fig. 30). This blank gluing pad 4 is movable in a plane generally normal to the supporting plate into and out of position substantially flush with said plate. The pad 4 is carried by a pivoted arm 81 and is adapted to reciprocate between the position shown in Fig. 5 at which its upper surface is approximately in the plane of the upper surface of the plate 3 and a lower position in which the pad 4 is approximately horizontal. In its upper position the pad 4 assists the plate 3 to strip a blank from the pack by adhering to a marginal portion or tab 4' of the end blank and thereby stripping the area gripped from the supporting fingers while the pack rests on the plate. The arm 81 is pivotally supported by a bracket 82 fixed to the table. A torsion spring 83 tends to raise the pad to its highest position as in Fig. 5. A link 84, the length of which is adjustable, is pivotally connected to one end of the arm 81 adjacent the glue pad and is actuated by a lever 85 pivotally secured to the table 11, and adapted to be lowered by a link 86 operated by an arm 87 fixed to a horizontal shaft 88. A spring 89 tends to rock the shaft 88 through the instrumentality of a pin or shaft arm 90 in order to assist the spring 83 in raising the glue pad 4. The shaft 88 is rocked in the reverse direction, that is, for the purpose of lowering the glue pad, by an arm 91 (Fig. 10) operated by a link 92 pivotally connected to a follower 93 which carries a roller 94 bearing against the surface of a cam 95 on the cam shaft 18. The glue pad is adapted to be lowered slightly before beginning its main withdrawing movement in order to space apart the area of the end blank adhering to the pad from the next succeeding blank. With this end in view, the contour of the cam 95 as shown in Fig. 10 is such that the glue pad will from its uppermost position first be lowered only slightly and dwell for a time before being drawn down to its lowermost position. The contact of the glue pad with a portion of the blank serves to apply glue to this portion, and thus the glue pad serves the double purpose of assisting in stripping a single blank from the blank magazine and of applying the adhesive necessary for sealing. Glue is applied to the member 4 when its upper surface is approximately horizontal, that is at the lowest position of the pad, by means of a sliding glue roller 96 (Figs. 28 and 29) which is rotatably mounted on a stud 97 adjustably held by a plate 98 fixed to a dovetail slide 99. The slide 99 is carried by a fixed bracket 100 having a cooperating dovetail groove (see Figs. 1, 28 and 29). Reciprocating motion is imparted to slide 99 by a link 101 pivotally secured thereto and moved by an arm 102 fixed to a horizontal shaft 103 as shown best in Figs. 1, 2 and 21. The shaft 103 is rocked by an arm 104 which is connected by means of a link 105 to an arm 106 fixed on a stub shaft 107 continuously rotated by shaft 21 by means of enmeshing gears 108 and 109. In the present embodiment glue is applied to the roller 96 from a glue pot 110 provided with three rollers 111, 112 and 113. These rollers may be positively driven by gears as shown, the shaft of the roller 111 being rotated continuously by means of a chain 114 operated by a sprocket on the drive shaft 14. The movable glue roller 96 in its retracted position lies against the roller 113 and transfers glue to the pad 4 by rolling over the surface of the pad both in its forward and backward path.

When the pack of blanks has been allowed to rest against the plate, the glue pad and the former, the pneumatic gripper openings in both the former and the supporting plate are automatically energized so that the lowermost blank is firmly gripped, the various mechanisms for establishing communication between the gripper openings and air exhausts being timed to establish the suction effect at the proper time. The cooperation of the parts whose function it is to strip a single blank from the pack, to affix the blank in a surely determined position against the former and to apply glue over a marginal portion of the surface of the blank is timed as follows: The blank magazine descends vertically and positions the pack of blanks against the plate 3 as indicated by the dot-dash line at 2' in Fig. 6, the construction and adjustments of the magazine being such as to determine a position of the blank in which an edge just overlaps the pneumatic gripper openings 38 in the surface of the conical former. Also it will be seen that a portion of the blank extends longitudinally beyond the terminal point of the former. Obviously, capability of holding water necessitates the formation of a perfectly coiled cone having a closed apex and the certain positioning described is of prime importance in thus coiling a blank to form the required cone. The glue pad 4 may be assumed to have been previously wiped by the sliding glue roller and to lie in the position of Fig. 8 in approximately the same plane as the supporting plate 3. The blank magazine then makes its descent so that the lowermost blank held by the supporting fingers of the magazine rests against the plate 3, glue pad 4 and conical former 1 which is then at rest at station A. As previously mentioned the magazine carrier allows the weight of the pack to be borne principally by the supporting plate 3 at this point. Thereupon the valve 71 in the pipe 70 is opened and the vacuum plate 32 of the turret head is actuated so that communication will be established between the pneumatic gripper openings in the supporting plate 3 and in the conical former with the air exhaust 24, thus causing the lowermost blank in the pack to be firmly gripped to the former and to the plate. The lowermost blank will also adhere at the portion 4' to the adhesive surface of the glue pad 4 and the weight of the pack serves to press the gripped blank firmly against its supports. The glue pad 4 then makes a short descent as shown, slightly exaggerated, in Fig. 7, to separate the marginal portion of the blank gripped thereby from the next overlying blank in the magazine, the pad 4 drawing this portion from the supporting fingers and permitting air to enter readily between this blank and the one immediately above it. When the edge of the lowermost blank has been thus spaced from the next blank above it the magazine rises and carries with it the pack of blanks leaving, however, the blank gripped by the plate 3 and adhering to the pad 4. This blank parts readily from the remainder of the blanks held by the fingers 65 by reason of the suction effect of the plate 3 and for the reason that this effort, according to the present embodiment, is directed only against the lowermost blank, air having been permitted to enter between the blanks in the manner described. A guiding device is provided to direct the initial recessional movement of the magazine in a path normal to the surface of the plate 3 and to the element of the former against which the gripped blank rests, thereby assisting the separation of the pack by a sort of pivotal motion. A bellcrank lever 360 is rigidly secured to the member 60 and pivotally connected to a link 361, pivotally mounted on a stationary pin 362. As shown in Fig. 7, upward motion of the magazine carrier 45 causes an initial resultant motion of the magazine to the left as well as up by reason of the thrust of the connecting link 361 swinging on pin 362. The delivered blank will now remain gripped securely by the glue pad, the plate and the former.

At this point a plate 5 advances to press the coated portion of the blank against the glue pad and thereby to distribute glue evenly over the marginal area 4' of the blank. The press plate 5, having the general shape of glue pad 4, (Figs. 5, 11 and 12), is carried by an arm 115 pivotally secured to the table and is adapted to move into and out of position to accomplish the pressing effect mentioned. The plate 5 is pulled down by an adjustable link 116 which is fastened to a bellcrank lever 117 pivotally secured to the table, which lever is operated by a link 118. A sleeve 119 on the shaft 75 carries an arm 120 pivotally secured to link 118 and a second arm 121 to which motion is imparted by a follower 122 which carries a roller 123 bearing on the surface of a cam 124 on shaft 51.

After the press plate 5 has pressed the portion 4' of the blank against the pad to spread the glue as described, the plate 5 recedes and the glue pad 4 is lowered for a fresh supply of glue. At this point the turret head is rotated through a 90° arc and at the same time the pneumatic grip of the supporting plate 3 is released so that the blank will be gripped only by the conical former 1 and carried ahead by the former in its translatory movement. When the next former comes to rest at station A the various operations are repeated in the same sequence on a succeeding blank.

At station B the coiling of the blank is effected in conjunction with a presser which cooperates along the upper element of the former to its apex to press the blank firmly against the former. In the form disclosed this presser embodies a spring plate 6 (Figs. 13, 15 and 16) which has a plurality of spring teeth 126 and is adjustably secured to a stationary arm 125 having a bearing through which shaft 21 passes. The plate 6 is secured to arm 125' to allow a slight play of the teeth which are so disposed that their lower surfaces press against the upper element of the cone as the former comes to rest at station B, thus serving to partly coil the blank fixed on the former during the motion of translation, under the teeth 126 which extend transversely of the axis of the former and are substantially tangent to the conical surface. It will be understood that the former is normally locked from rotation by a pawl 128 carried by spring plate 129 secured to the turret head, and engaging the teeth of a gear 127 (Figs. 13 and 17) keyed to the former. When the former comes to rest, devices automatically operate to release the lock and to rotate the former a plurality of times, thus completing the coiling of the blank under the spring plate.

On reference to Figs. 13, 15 and 16, it will be seen that the series of resiliently acting pressing members, or teeth 126, extends longitudinally of the former at station B, and the blank is pressed toward the former at several different points, resilient action of one tooth being more or less independent of that of another, so as to accommodate any irregularity in thickness of the coiled article and avoid injury to the machine in case a real obstruction is presented. The presser lies close to the path of the former 1, and a portion thereof, as for instance one of the teeth 126, lies closely adjacent the terminal point, or apex, of the former so as efficiently to coil and press the blank at the point of the former. To assure that the blank shall be efficiently coiled at the apex it is better to have the presser extend slightly beyond the terminal point of the former toward the longitudinal axis of the former rather than have it terminate short of the terminal point. As the former and its held blank are translated from station A to station B, the relative rotary movement between the former 1 and the presser, due to the arcuate path of the former, cause the gripped edge of the blank to be advanced relative to the presser before reaching the presser, so that the presser at station B initially contacts the blank behind its advance edge. This relative movement not only partially coils the blank but disposes its advance edge in such position that it is not wiped by the presser with consequent danger of being thrust from the former.

The operation of rotating the former at station B will now be described. As best shown in Figures 17 and 18, an oscillatable arm 130 is journaled on shaft 18 and is normally held in the position of Fig. 17 by a link 131 pivotally fastened to an arm 132 which is fixed to a stub shaft 133 supported by a stationary bracket. The shaft 133 is rocked by an arm 134 which carries a roller 135 bearing against the surface of a cam 136 on shaft 18. The arm 130 carries a finger 144 to which a roller 145 is attached, the latter extending beyond the end of the arm, and adjacent this end the arm carries a pinion 138, the arm also serving to support stub shafts 140 and 141. Reference being had to Fig. 18, it will be seen that rotation is imparted to the last of these shafts by mounting a mutilated gear 143 upon the shaft 18, the teeth of this gear being engageable with the teeth of a gear 142 secured to the shaft 141. Sprockets are attached one to each of the shafts 140 and 141 and a suitable chain extends between these sprockets to transmit movement from one to the other. In mesh with a gear 138 is a gear 139 carried by the stub shaft 140 and thus it will be apparent that as the teeth of the mutilated gear 143 periodically mesh with the teeth of the gear 142, the gear 138 will be driven. Again referring to Fig. 17, it will be perceived that according to the present construction, a positive rocking of the arm 130 towards the bracket 47 is assured, when such rocking is permitted by the cam 136, by virtue of the fact that a spring 137 is employed having one of its ends connected to the bracket, its opposite end being attached to the arm 130.

Thus when the conical former comes to rest at station B the arm 130 is allowed to rock inwardly to position the driving pinion 138 in mesh with the driven pinion 127 on the former and to cause the roller 145 to remove pawl 128 from its locking position. Upon engagement of the pinions 138 and 127 the mutilated gear 143 is timed to rotate the gear 142 and thus automatically to connect the former with its rotating mechanism. The gear 142 imparts consequent rotation to the gear 127 by reason of the intervening gears 138 and 139 and the sprocket and chain connection between the shafts 140 and 141 as described. In this manner the former is rotated twice at station B and the blank is tightly coiled about the former under the pressure of the spring plate 6. The arm 130 is then rocked away from the former and the pawl 128 slips back in position to lock the former against rotation with respect to the turret head, preparatory to another step in the translation of the former.

A series of stiff brushes 7 is mounted adjacent the path of translation of the former from station B to a point beyond station C (see Fig. 1). These brushes serve to iron the coiled blank and to press the glued parts together so that the cone is firmly pressed against the former especially near its apex where the blank is most sharply coiled and where the tendency to uncoil is the greatest. It will be perceived that the period of ironing effect is long enough to insure a forced coiling while the glue is drying to some extent and it has been found that cones so formed maintain their closely coiled structure efficiently.

By the present invention the means for applying a blank to a former and the means for gripping and pressing a blank to the former while the cone is being formed operate to largely avoid any displacement or incorrect position of the blank so that the objects mentioned are accomplished, and each cup is perfectly and permanently formed.

Figure 21:
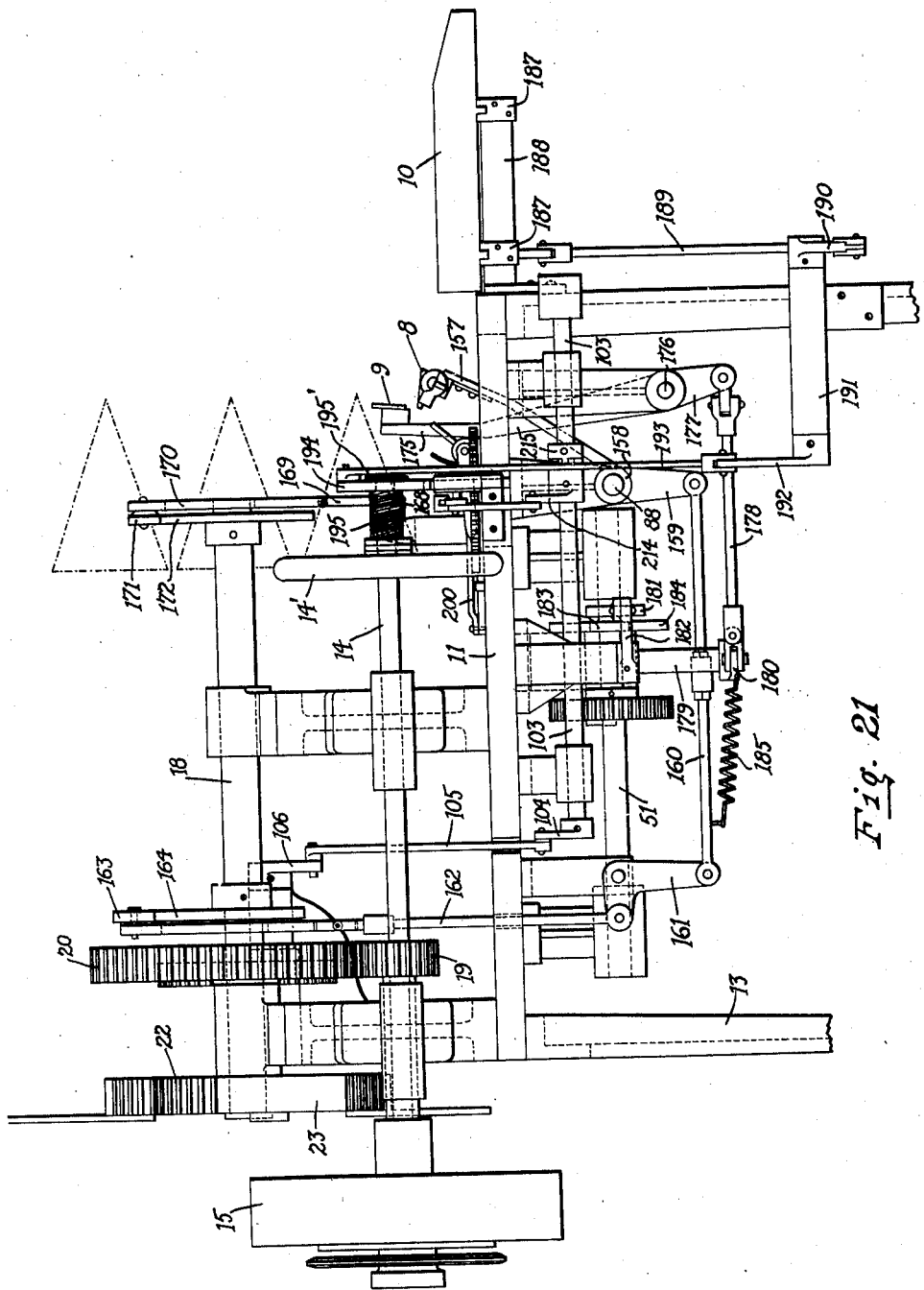
Fig. 21 is a fragmentary side elevation of the discharge mechanism and other parts.
Figure 22:
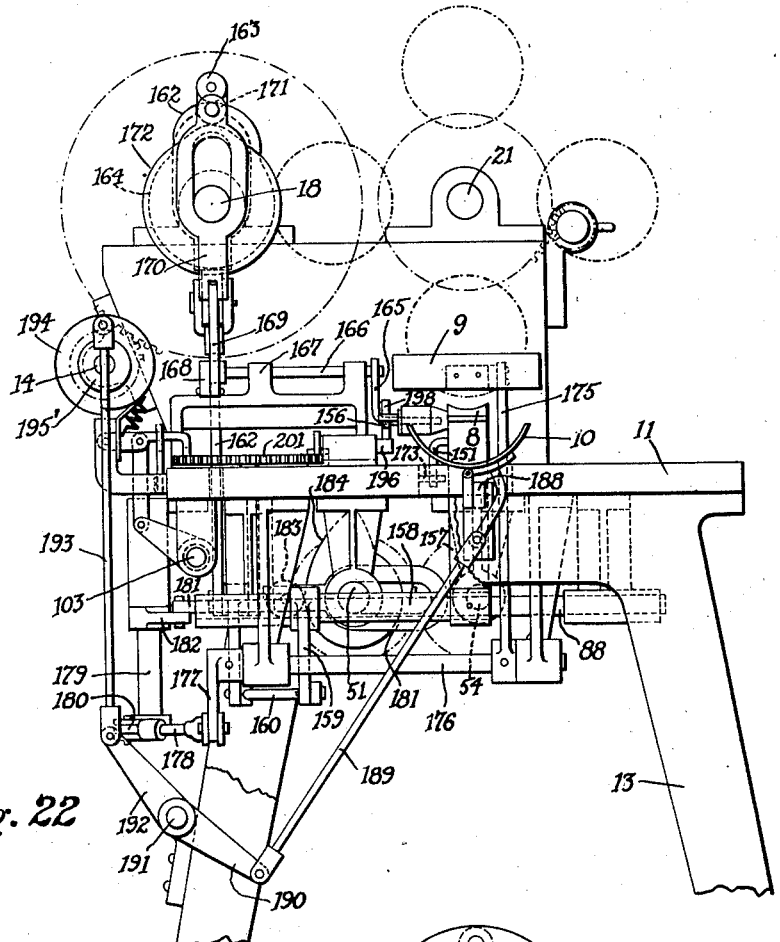
Fig. 22 is a similar front elevation.
Figures 25, 26:
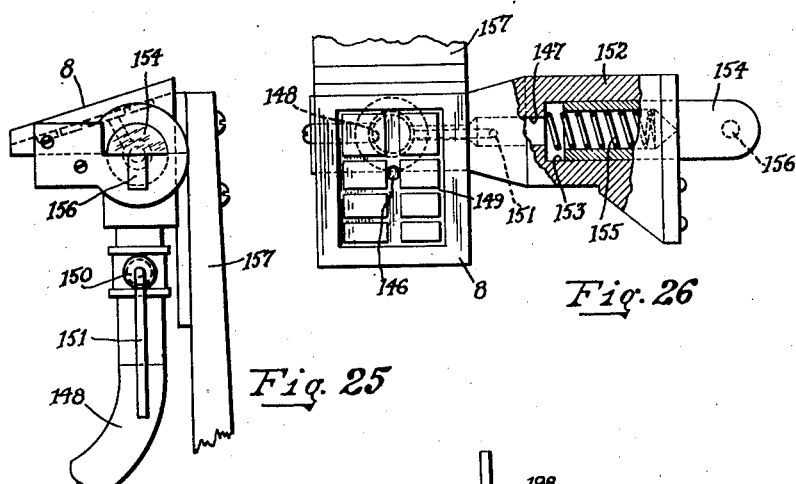
Fig. 25 is a detail of the carrier head.
Fig. 26 is a similar top view partly in section.

The devices adjacent station D concern the stripping of the completed cup from the former and the discharge of a counted stack of cones suitable for use in dispensing apparatus. When the former comes to rest a short distance above table 11 the stripper 8 advances to grip the cup on the former and carry it off the former in a generally axial direction therefrom, whereupon the cups are removed from the stripper and deposited in a receptacle 10 in nested relationship to each other as will appear. In the present embodiment the stripper includes an article carrier 8 having a pneumatic gripper opening 146 in its face which is curved to conform generally to the surface of the conical cup and fit closely thereagainst (see Fig. 22). The opening 146 communicates with an air chamber 147 from which a flexible pipe 148 leads to the air exhaust tank. The face of the carrier 8 is provided with grooves or depressions 149 to distribute the suction effect over a material area. A rotary valve 150 is included in the pipe 148 and is provided with a depending pin 151 which is automatically oscillatable to open and close the valve 150 and thereby control the energization of the gripper opening in the face of the carrier. An extended portion 152 of the carrier has a cylindrical recess 153 in communication with the air chamber 147 and a reciprocatory piston 154 is adapted to be drawn inwardly by the vacuum effect in chamber 147 and urged outwardly by a coil spring 155 as shown clearly in Figs. 25 and 26. Outside the cylinder 152 the piston carries a relatively fixed pin 156 which serves as a counter-actuating member as will appear. The carrier plate 8 and the cylinder 152 reciprocate axially of the former at station D, being carried by a rock arm 157 fixed to a sleeve 158 which is adapted to oscillate upon the shaft 88 (Figs. 21 and 22). Rocking movement is imparted to the sleeve 158 and consequent reciprocation to the carrier 8 by an arm 159 which is operated by an adjustable link 160 pivotally secured thereto and pivotally connected at its other end to a bellcrank lever 161 mounted on a bracket depending from the table. The lever 161 is moved by a follower 162 which carries a roller 163 bearing against the surface of a cam 164 on the shaft 18.

Figure 24:
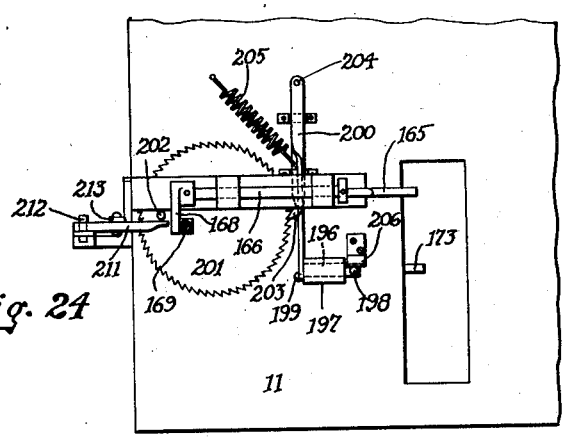
Fig. 24 is a fragmentary plan view of the counter and counter-actuating mechanism.

As mentioned, the valve 150 is adapted to be automatically operated to control the suction effect in the carrier 8. To this end, means movable relative to the carrier are provided to open the valve when the carrier face has been set against the cone on the former in order to grip the cone and thus carry it off when the carrier makes its forward move. As best shown in Figs. 22 and 24 the means for moving the pin 151 to open the valve comprise a rock arm 165 fixed to a horizontal rod 166 journaled in a bearing bracket 167 fixed to the table. The rod 166 is adapted to be oscillated by an arm 168 adjacent its other end and the arm 168 is moved by a pivotally connected link 169 fixed to a follower 170 which carries a roller 171 bearing against the surface of a cam 172 on the shaft 18. In the path of the valve pin 151 a stationary pin 173 is disposed which operates to close the valve 150 at a predetermined point in the outward movement of the carrier and thus release the suction effect in the carrier face.

Means are provided to remove the cones from the carrier and comprise a plate or pusher 9 carried by an arm 175 secured to a horizontal shaft 176 held by suitable bearings depending from the table, and the arm 175 is adapted to follow the carrier arm in its forward movement and to effect discharge of a cone from the carrier when the vacuum effect therein is released. The shaft 176 is adapted to be reciprocally rotated by an arm 177 which is rocked by a pivoted link 178. Motion is imparted to this link by oscillation of a vertical rod 179 by means of a connecting arm 180. The rod 179 is oscillated by means of a connecting arm 182 by a follower 181 carrying a roller 183 which bears against the surface of cam 184 mounted on shaft 51. A spring 185 connects the arm 180 to the link 160 to contribute a sort of following motion to the cup pushing arm.

When the article carrier 8 is in its forward position as in Fig. 21 the cone carried thereby will be held loosely on its curved face plate, the pneumatic grip having been broken as has been described by the oscillation of the valve pin 151 in the forward motion of the carrier, and the pusher arm 175 is then moved forward sharply causing the plate 9 to tap the lip of the cone resting in the carrier and thus cause the cone to be deposited upon the pan 10. The discharge of a succeeding cone in the same manner in the direction of a preceding cone causes the cones, or cups, to be nested one within the other on the receiver. A spring plate guide 186 (Fig. 1) may be fixed over the pan to determine the position of the first cone deposited and to insure a stationary disposition of the stack. As may be seen in Fig. 19 the pneumatic grip of the former is released before the carrier grips the cone, the air chamber 33 failing to extend to a position corresponding to station D. The release of the suction grip through the former is quickened by the communication allowed through the former to the atmosphere by way of the hole 35 supplemented by the free communication at the depression 39 in the surface of the former. In this manner the resistance to stripping will be reduced to a minimum and the carrier described operates effectively to remove a cone from the former at the proper time.

The machine may also include stack discharging means operating after a predetermined number of articles have been grouped together. To this end the pan 10 is pivotally mounted on a bracket 188 secured to the table and is adapted to be tilted at a certain interval by a link 189 operated by an arm 190 carried by a rock shaft 191. The shaft 191 is journaled in a suitable bracket mounted on a leg of the table and carries at its rear end an arm 192 adapted to be rocked periodically by a link 193, which is pivotally fixed to a member or disc 194 loosely mounted on the power shaft 14 and frictionally rotatable thereby through the cooperation of a spring 195 which serves to press the disc 194 against the face plate 195' constantly rotating with the shaft 14. The disc 194 is normally kept from rotation by a stop controlled by the counter as will appear, while the cups are being deposited in the pan 10 and is allowed to make a single rotation at periodical intervals to cause a tilting of the pan and a consequent discharge of the stack of cups therefrom when a predetermined number have been received.

Figure 23:
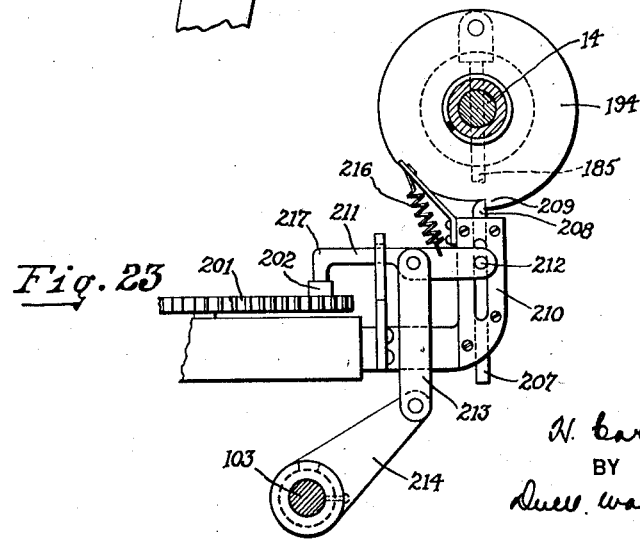
Fig. 23 is a fragmentary detail of the counting mechanism.
Figure 27:
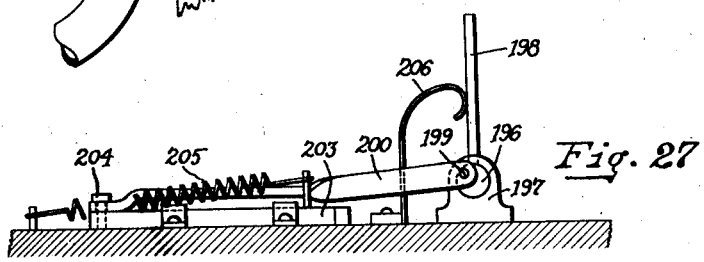
Fig. 27 is a fragmentary detail of part of the counting mechanism.

Counting means are provided for the cups as discharged and a counter actuating means dependent on the discharge means. The details of the devices for counting the cups are best illustrated in Figs. 23, 24 and 27. A horizontal rock shaft 196 is journaled in a bracket 197 fixed to the table and carries at one end a vertical pin 198 which lies in the path of the pin 156 of the carrier. When the cup is in the pneumatic grip of the carrier, and the carrier makes its forward move the pin 156 engages the pin 198 and by the consequent rocking of the shaft 196 the counting is effected in the following manner. A pin 199 is eccentrically fixed to one end of shaft 196 and a slidable member 200 is pivotally secured to the pin 199 and thereby reciprocated at each rocking of the shaft 196. A horizontally disposed disc 201 having a toothed periphery is rotatably mounted over the table and carries a pin 202 upstanding from its surface. A finger 203, pivotally connected to the slidable member 200 by a pin 204 is adapted to engage the teeth of the disc 201, so that the disc will be rotated through an arc corresponding to one of its teeth at every reciprocation of the member 200. A spring 205 fixed to the table may be secured to the finger 203 to insure engagement thereof with the teeth of the disc 201 at all times and to urge the slide 200 backward after its forward motion. A spring plate 206 against which the pin 198 rests on its return movement is preferably provided.

The cooperation of the discharge arm with the counter to rotate the disc 201 with the discharge of every cup proceeds as follows: Upon the forward motion of the carrier arm 157 carrying a cone pneumatically gripped by its face plate the piston 154 is drawn in by the suction within the air chamber 147 to such a position that the pin or trip 156 will engage the pin 198 thereby rocking the shaft 196 and causing a forward motion of the finger 203. When the arm 157 approaches its extreme forward position the pin 156 slips past the pin 198 which is then returned to its original position against the spring plate 206 by reason of the tension of spring 205. At the forward position of the arm 157 the suction within the air chamber 147 is cut off as described by oscillation of the valve pin 151 and the spring 155 urges the piston 154 outwardly to the position shown in Fig. 26. Upon the subsequent retraction of the arm 157 the extended pin 156 will fail to engage the pin 198. At the retracted position of arm 157, that is, when the carrier plate lies against a cone on the former, the valve 150 is opened as explained and the suction within the air chamber 147 pulls the piston inwardly so that the pin 156 will occupy an operative position preparatory to engaging pin 198 on the next forward motion of the carrier arm. It will be evident that by the means described the disc 201 will be rotated through the arc of one of its teeth with the discharge of each cone.

Mechanism is provided for allowing rotation of the disc 194 operative to cause a tilting of the article receiver 10 and discharge of the stack of cones held thereon when the discharge of a predetermined number of cones has been effected as best shown in Fig. 23. The rotatable member 194 is normally held from rotation on shaft 14 by a stop 207 having an end 208 which engages a projecting part 209 of disc 194. The stop 207 is movable in and out of engagement with the rotatable member by vertical reciprocation in a bracket 210 secured to the table and is pivotally connected for such reciprocation to one end of a vibratory arm 211 at 212. The arm 211 is urged downwardly at every oscillation of the shaft 103 (rocked as previously described to operate the slidable glue roller) by means of a link 213 pivotally secured to the arm 211 intermediate its ends and operated by an arm 214 to which motion is imparted at every oscillation of the shaft 103 by a dog 215 fixed to the shaft (Fig. 21). The arm 211 may be pulled up again by a spring 216, an end of which is held by a part of the stationary bracket 210. At every oscillation of the shaft 103 a downward tension is occasioned on the arm 211 which will normally pivot upon the pin 212 by reason of the friction existing between the end 208 of the stop and the disc 194 supplemented by the tendency of spring 216 to uphold the pivoted end of the arm 211, so that the other end 217 will be depressed against the face of the disc 201. When the disc has been rotated step by step to the position of Fig. 23 where the pin 202 assumes a position directly beneath the end 217 of the pivotal arm 211 the downward pull on link 213 results in pivotal motion of the arm 211 upon the pin 212 as a center, and the stop 207 will be disengaged from the disc 194. Upon such disengagement the disc 194 is rotated with the shaft 14 by reason of the frictional clutch effect of the end plate 195' against which the disc 194 is pressed by the spring 195. As the disc rotates the link 193 pivotally secured thereto depresses the arm 192 and operates through the means described to tilt the pan 10 thus causing the counted stack of cones resting on the pan to be ejected therefrom. Obviously periodic discharge of the stack of cones will be effected with the discharge of a certain predetermined number of cones equal to the number of teeth on the disc 201, the carrier arm causing fractional rotation of the disc at every forward move.

From the foregoing, it will be appreciated, briefly reviewing the operations of the machine embracing the embodiment illustrated and described, that a single paper blank substantially sector-shaped is stripped from a pack and set against a conical former and glue is applied over a portion of the surface of the blank adjacent an edge. The blank is pneumatically gripped by the former by means of gripper openings along the surface of the former and the former is then translated in a circular path over an arc of 90° carrying the blank and coiling it partially around the former. The former and blank will now lie adjacent the presser plate and the leading edge of the blank will have been advanced to a point beyond the same. By means of the mechanism provided, the former is now rotated twice thus coiling the blank into a cone and pressing the overlapping glued edge portions thereof into intimate contact from the vertex to the base of its body. In being further translated to and from the third station, the former moves adjacent the wiping element provided by the brush and in such movement the latter bears against the outer face of the blank and adjacent the overlapped edge portions thereof to assure the permanency of the seal. At the fourth station of rest, the cone is discharged from the former and stacked within a cone which may have preceded it. When a certain predetermined number of cones has been stacked devices automatically operate to remove the stack of cones from the receiving element provided therefor. The operation of the various devices is automatic and continuous throughout, and a large number of perfect cones may be manufactured in a short space of time. While paper coated with some substance, as paraffin, may be employed, the present machine provides a product which is water-tight when made from uncoated paper.

As described, the entire operation of the machine from the stripping of the blanks from a pack to the discharge of a stack of counted cones is automatic, continuous and rapid. Cones for use as drinking cups should be perfectly coiled and sealed and the mechanism employed for exactly positioning a single blank against a former and for securely holding this blank during the coiling process operates to produce a cone having the required characteristics. As has been described in detail the magazine is first loaded with a pile of blanks and the clutch is thrown in to rotate the drive shaft, causing the various devices to function. A single blank is thereupon stripped from the bottom of the pack and held in a perfectly determined position so that an edge of the sector of the blank overlaps the pneumatic gripper openings of the former. Glue is applied and spread evenly over the contact area of the projecting tab of the blank which is to comprise the sealing surface. The blank is gripped securely to the former so that no displacement will occur during the pressure of the spring plate against the former in the process of coiling the blank at station B. The ironing brushes then operate to press the cone against the former until the cone assumes a permanent form consequent to a partial setting of the adhesive. After the cone has thus been permanently formed the various mechanisms employed operate to discharge the cones, stack the cones so formed one within another and eject the stack of counted cones at predetermined intervals. In a cone so shaped and formed the area glued in the manner described forms an overlap extending along the joint of the cone and greater adjacent the apex, giving the cone in places a double ply of material, and the sealing tab may completely encircle the apex and provide substantial reinforcement for the formed cone.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is:

1. In an apparatus of the character described, in combination, a blank-supporting plate, a former, means adapted to apply a blank to said plate and said former, and means adapted simultaneously to grip the applied blank both to said plate and to said former.

2. In an apparatus of the character described, in combination, a blank-supporting plate, a former, means adapted to apply a blank to said plate and said former, and means adapted simultaneously to grip the applied blank both to said plate and to said former including pneumatic openings in said plate.

3. In an apparatus of the character described, in combination, a blank-supporting plate, a former, means adapted to apply a blank to said plate and said former and means adapted simultaneously to grip the applied blank both to said plate and to said former, including pneumatic openings in said plate and in said former.

4. In an apparatus of the character described, in combination, a blank-supporting plate, a former, means including a reciprocatory blank carrier adapted to apply a blank to said plate and said former, and means adapted simultaneously to grip the applied blank both to said plate and to said former.

5. In an apparatus of the character described, in combination, a blank-supporting plate, a former, means including a reciprocatory blank carrier movable in a plane generally normal to said plate and former adapted to apply a blank to said plate and said former, and means adapted simultaneously to grip the applied blank both to said plate and to said former.

6. In an apparatus of the character described, in combination, a blank-supporting plate, a former, means adapted to apply a blank to said plate and said former including a blank magazine, movable in a plane generally normal to said plate and former, adapted to apply the pack of blanks to said plate.

7. In an apparatus of the character described, in combination, a blank-supporting plate, a former, means adapted to apply a blank to said plate and said former, including a reciprocatory magazine carrier movable in a plane generally normal to said plate and former, and a blank magazine connected to said carrier for movement relative thereto in said plane.

8. In an apparatus of the character described, in combination, a blank-supporting plate, a former, means adapted to apply a blank to said plate and said former, including a reciprocatory magazine carrier movable in a plane generally normal to said plate and former, and a blank magazine pivoted to said carrier for movement relative thereto in said plane.

9. In an apparatus of the character described, in combination, a blank-supporting plate, a former, means adapted to apply a blank to said plate and said former including a blank magazine, movable in a plane generally normal to said plate and former, adapted to apply the pack of blanks to said plate, and means adapted to grip the applied blank to said plate and said former.

10. In an apparatus of the character described, in combination, a blank-supporting plate, a former, means adapted to apply a blank to said plate and said former including a blank magazine, movable in a plane generally normal to said plate and former, adapted to apply the pack of blanks to said plate, and means adapted to pneumatically grip the applied blank to said plate and said former.

11. In an apparatus of the character described, in combination, a blank-supporting plate, a former, means adapted to apply a blank to said plate and said former including a blank magazine, movable in a plane generally normal to said plate and former, adapted to apply the pack of blanks to said plate, and means adapted simultaneously to pneumatically grip the applied blank both to said plate and to said former.

12. In an apparatus of the character described, in combination, a blank-supporting plate, a former, means adapted to apply a blank to said plate and said former including a reciprocatory magazine carrier movable in a plane generally normal to said plate and former, and a blank magazine connected to said carrier for movement relative thereto in said plane, and means adapted pneumatically to grip the applied blank to said plate and said former.

13. In an apparatus of the character described, in combination, a blank supporting plate, means adapted to apply a blank to said plate, and means adapted pneumatically to grip the applied blank to said plate, said applying means including a blank magazine movable in a plane generally normal to said plate adapted to apply the pack of blanks to said plate.

14. In an apparatus of the character described, in combination, a blank supporting plate, means adapted to apply a blank to said plate, means adapted to grip the applied blank to said plate, said applying means including a reciprocatory magazine carrier movable in a plane generally normal to said plate, and a blank magazine connected to said carrier for movement relative thereto in said plane.

15. In an apparatus of the character described, in combination, a blank supporting plate, means adapted to apply a blank to said plate, means adapted pneumatically to grip the applied blank to said plate, said applying means including a reciprocatory magazine carrier movable in a plane, generally normal to said plate, and a blank magazine connected to said carrier for movement relative thereto in said plane.

16. In an apparatus of the character described, in combination, a blank supporting plate including one or more pneumatic gripper openings, a conical former having one or more pneumatic gripper openings in its conical surface, and a blank magazine movable toward and from said plate and former adapted to apply the end blank of the pack both to said plate and to said former over said openings.

17. In an apparatus of the character described, in combination, a blank supporting plate including one or more pneumatic gripper openings, a conical former having one or more pneumatic gripper openings in its conical surface, a blank magazine movable toward and from said plate and former adapted to apply the end blank of the pack both to said plate and to said former over said openings, a magazine carrier, and connections between said magazine and said carrier adapted to permit movement of said magazine relative to said carrier in directions toward and from said plate.

18. In an apparatus of the character described, in combination, a blank supporting plate including one or more pneumatic gripper openings, a conical former having one or more pneumatic gripper openings in its conical surface, a blank magazine movable toward and from said plate and former adapted to apply the end blank of the pack both to said plate and to said former over said openings, a magazine carrier, and connections between said magazine and said carrier adapted to permit movement of said magazine relative to said carrier in directions toward and from said plate, said magazine including blank supporting fingers arranged to permit the pack of blanks to lie on said plate.

19. In an apparatus of the character described, in combination, a blank supporting plate including one or more pneumatic gripper openings, a conical former having one or more pneumatic gripper openings in its conical surface, a blank magazine movable toward and from said plate and former adapted to apply the end blank of the pack both to said plate and to said former over said openings, and means adapted to energize the pneumatic gripper openings in said former and said plate to effect gripping of said end blank thereto simultaneously.

20. In an apparatus of the character described, in combination, a supporting plate, means adapted to apply to and remove a pack of blanks from said plate, means adapted to hold an end blank of said pack on said plate, and means adapted to space apart a portion of the areas of said end blank and the next adjacent blank of said pack.

21. In an apparatus of the character described, in combination, a supporting plate, means adapted to apply to and remove a pack of blanks from said plate, means adapted to hold an end blank of said pack on said plate, and means adapted to space apart a portion of the areas of said end blank and the next adjacent blank of said pack said holding means including one or more pneumatic gripper openings in said plate.

22. In an apparatus of the character described, in combination, a supporting plate, means adapted to apply to and remove a pack of blanks from said plate, means adapted to hold an end blank of said pack on said plate, and means adapted to space apart a portion of the areas of said end blank and the next adjacent blank of said pack said spacing means including a reciprocatory pad adapted to adhere to said end blank.

23. In an apparatus of the character described, in combination, a supporting plate, means adapted to apply to and remove a pack of blanks from said plate, means adapted to hold an end blank of said pack on said plate, and means adapted to space apart a portion of the areas of said end blank and the next adjacent blank of said pack said holding means including one or more pneumatic gripper openings in said plate said spacing means including a reciprocatory pad adapted to adhere to said end blank.

24. In an apparatus of the character described, in combination, a supporting plate, a magazine including a plurality of fingers adapted to support a pack of blanks therebetween, means adapted to move said magazine to apply to and remove said pack from said plate, means adapted to hold an end blank of said pack on said plate, and means adapted to space apart a portion of the areas of said end blank and the next adjacent blank of said pack while another portion of said end blank is held on said plate.

25. In an apparatus of the character described, in combination, a supporting plate, a magazine including a plurality of fingers adapted to support a pack of blanks therebetween, means adapted to move said magazine to apply to and remove said pack from said plate, means adapted to hold an end blank of said pack on said plate, and means adapted to space apart a portion of the areas of said end blank and the next adjacent blank of said pack while another portion of said end blank is held on said plate said spacing means including a member adapted to strip a marginal portion of said end blank from one or more of said fingers.

26. In an apparatus of the character described, in combination, a supporting plate, a magazine including a plurality of fingers adapted to support a pack of blanks therebetween, means adapted to move said magazine to apply to and remove said pack from said plate, means adapted to hold an end blank of said pack on said plate, and means adapted to space apart a portion of the areas of said end blank and the next adjacent blank of said pack while another portion of said end blank is held on said plate, said holding means including one or more pneumatic gripper openings in said plate.

27. In an apparatus of the character described, in combination, a supporting plate, a magazine including a plurality of fingers adapted to support a pack of blanks therebetween, means adapted to move said magazine to apply to and remove said pack from said plate, means adapted to hold an end blank of said pack on said plate, means adapted to space apart a portion of the areas of said end blank and the next adjacent blank of said pack while another portion of said end blank is held on said plate, and a loose connection between said fingers and said magazine moving means adapted to permit said pack to rest on said plate.

28. In an apparatus of the character described, in combination, a supporting plate, a magazine including a plurality of fingers adapted to support a pack of blanks therebetween, means adapted to move said magazine to apply to and remove said pack from said plate, means adapted to hold an end blank of said pack on said plate, and means adapted to space apart a portion of the areas of said end blank and the next adjacent blank of said pack while another portion of said end blank is held on said plate said spacing means including a member adapted to strip a marginal portion of said end blank from one or more of said fingers, said holding means including one or more pneumatic gripper openings in said plate.

29. In an apparatus of the character described, in combination, a supporting plate, a magazine including a plurality of fingers adapted to support a pack of blanks therebetween, means adapted to move said magazine to apply to and remove said pack from said plate, means adapted to hold an end blank of said pack on said plate, means adapted to space apart a portion of the areas of said end blank and the next adjacent blank of said pack while another portion of said end blank is held on said plate said spacing means including a member adapted to strip a marginal portion of said end blank from one or more of said fingers, and a loose connection between said fingers and said magazine moving means adapted to permit said pack to rest on said plate.

30. In an apparatus of the character described, in combination, a supporting plate, a magazine including a plurality of fingers adapted to support a pack of blanks therebetween, means adapted to move said magazine to apply to and remove said pack from said plate, means adapted to hold an end blank of said pack on said plate, means adapted to space apart a portion of the areas of said end blank and the next adjacent blank of said pack while another portion of said end blank is held on said plate, said holding means including one or more pneumatic gripper openings in said plate, and a loose connection between said fingers and said magazine moving means adapted to permit said pack to rest on said plate.

31. In an apparatus of the character described, in combination, a supporting plate, a magazine including a plurality of fingers adapted to support a pack of blanks therebetween, means adapted to move said magazine to apply to and remove said pack from said plate, means adapted to hold an end blank of said pack on said plate, means adapted to space apart a portion of the areas of said end blank and the next adjacent blank of said pack while another portion of said end blank is held on said plate said spacing means including a member adapted to strip a marginal portion of said end blank from one or more of said fingers, said holding means including one or more pneumatic gripper openings in said plate, and a loose connection between said fingers and said magazine moving means adapted to permit said pack to rest on said plate.

32. In an apparatus of the character described, in combination, a supporting plate including one or more pneumatic gripper openings adapted to hold a blank on said plate, a magazine, including a plurality of fingers adapted to support a pack of blanks therebetween, adapted to move in a plane substantially normal to said plate, a reciprocal magazine carrier for moving said magazine to apply to and remove the pack from said plate, and connections between said carrier and said magazine adapted to permit movement of said magazine relative to said carrier in a plane generally normal to said plate.

33. In an apparatus of the character described, in combination, a supporting plate including one or more pneumatic gripper openings adapted to hold a blank on said plate, a magazine, including a plurality of fingers adapted to support a pack of blanks therebetween, adapted to move in a plane substantially normal to said plate, a reciprocal magazine carrier for moving said magazine to apply to and remove the pack from said plate, connections between said carrier and said magazine adapted to permit movement of said magazine relative to said carrier in a plane generally normal to said plate, and a reciprocatory pad adapted to adhere to the blank in contact with said plate and strip a marginal portion thereof from one or more of said fingers while said pack rests on said plate.

34. In an apparatus of the character described, in combination, a blank magazine, means adapted to strip the blanks one by one from said magazine including a member adapted to adhere to a portion of an end blank and means adapted to cause receding movement between said member and said magazine while said blank adheres to said member whereby upon the movement of said member and magazine being continued, one relative to the other, said blank will be removed by the former from the latter.

35. In an apparatus of the character described, in combination, a blank magazine, means adapted to strip the blanks one by one from said magazine including a member adapted to adhere to a portion of an end blank, means adapted to cause receding movement between said member and said magazine while said member adheres to said blank, and a blank gripper, between which and said magazine there are approaching and receding movements, adapted to cooperate to draw the remainder of said end blank from said magazine.

36. In an apparatus of the character described, in combination, a blank magazine, means adapted to strip the blanks one by one from said magazine including a glue pad adapted to adhere to a portion of an end blank and means adapted to cause receding movement between said glue pad and said magazine while said glue pad adheres to said blank, and a blank gripper between which and said magazine there are approaching and receding movements, adapted to cooperate to draw the remainder of said end blank from said magazine said gripper being stationary and including one or more pneumatic gripper openings.

37. In an apparatus of the character described, in combination, a blank magazine including a plurality of fingers having portions underlying the pack of blanks, a glue pad adapted to adhere to coat a portion of the end blank in contact with said underlying portions thereby leaving a portion of the underface of the lowermost blank uncoated, and means adapted to cause receding movement between said magazine and said pad while said pad adheres to said end blank.

38. In an apparatus of the character described, in combination, a blank magazine including a plurality of fingers having portions underlying the pack of blanks, a glue pad adapted to adhere to a portion of the end blank in contact with said underlying portions, means adapted to cause receding movement between said magazine and said pad while said pad adheres to said end blank, and a stationary pack support adapted to pneumatically grip another portion of said end blank during said receding movement of said pad.

39. In an apparatus of the character described, in combination, a blank magazine including a plurality of blank supporting fingers, a blank supporting plate including one or more pneumatic gripper openings adapted to hold blanks on said plate, a blank-gluing pad movable in a plane generally normal to said plate into and out of position substantially flush with said plate, a magazine carrier reciprocal in a plane generally normal to said plate, and means adapted to cause said pad to strip from one or more of said fingers the portion of the blank adhering thereto and said plate to grip said adhering blank during said stripping.

40. In an apparatus of the character described, in combination, a blank magazine including a plurality of blank supporting fingers, a blank supporting plate including one or more pneumatic gripper openings adapted to hold blanks on said plate, a blank-gluing pad movable in a plane generally normal to said plate into and out of position substantially flush with said plate, a magazine carrier reciprocal in a plane generally normal to said plate, and means adapted to cause said pad to strip from one or more of said fingers the portion of the blank adhering thereto and said plate to grip said adhering blank during said stripping said magazine being hinged to said carrier to permit the pack to rest on said plate during said stripping.

41. In an apparatus of the character described, in combination, a blank magazine including a plurality of blank supporting fingers having portions lying in an inclined plane and underlying the pack of blanks, an inclined blank supporting plate including one or more pneumatic gripper openings adapted to hold blanks on said plate, a blank-gluing pad movable in a plane generally normal to said plate into and out of position substantially flush with said plate, a magazine carrier reciprocal in a plane generally normal to said plate, a conical former having one or more pneumatic gripper openings in its surface adapted to lie in substantially the same plane as said plate, and means adapted to cause said pad to strip from one or more of said fingers the portion of the blank adhering thereto and said plate and former to grip said adhering blank during said stripping.

42. In an apparatus of the character described, in combination, a blank magazine including a plurality of blank supporting fingers having portions lying in an inclined plane and underlying the pack of blanks, an inclined blank supporting plate including one or more pneumatic gripper openings adapted to hold blanks on said plate, a blank-gluing pad movable in a plane generally normal to said plate into and out of position substantially flush with said plate, a magazine carrier reciprocal in a plane generally normal to said plate, a conical former having one or more pneumatic gripper openings in its surface adapted to lie in substantially the same plane as said plate, and means adapted to cause said pad to strip from one or more of said fingers the portion of the blank adhering thereto and said plate and former to grip said adhering blank during said stripping, said magazine being hinged to said carrier to permit the pack to rest on said plate and former during said stripping.

43. In an apparatus of the character described, in combination, a blank magazine, means adapted to strip the blanks one by one from the magazine including a glue pad adapted to adhere to a portion of an end blank and thereby coat it with glue, means adapted to cause approaching and receding movements between said magazine and pad, and a presser movable into and out of position to press the coated portion against said glue pad.

44. In an apparatus of the character described, in combination, a blank magazine including a plurality of blank supporting fingers having portions underlying the pack, means adapted to strip the blanks one by one from said fingers including a glue pad adapted to adhere to a portion of an end blank and thereby coat it with glue, means adapted to cause approaching and receding movements between said magazine and pad, and a presser movable into and out of position to press the coated portion against said glue pad.

45. In an apparatus of the character described, in combination, a blank magazine, means adapted to strip the blanks one by one from the magazine including a glue pad adapted to adhere to a portion of an end blank and thereby coat it with glue, means adapted to cause approaching and receding movements between said magazine and pad, a presser movable into and out of positon to press the coated portion against said glue pad, and a blank supporting and holding plate alongside the gluing position of said pad.

46. In an apparatus of the character described, in combination, a blank magazine, means adapted to strip the blanks one by one from the magazine including a glue pad adapted to adhere to a portion of an end blank and thereby coat it with glue, means adapted to cause approaching and receding movements between said magazine and pad, a presser movable into and out of position to press the coated portion against said glue pad, a blank supporting and holding plate alongside the gluing position of said pad, and a conical former into registry with which the blanks are brought by movement of said magazine.

47. In an apparatus of the character described, in combination, a blank magazine, means adapted to strip the blanks one by one from the magazine including a glue pad adapted to adhere to a portion of an end blank and thereby coat it with glue, means adapted to cause approaching and receiving movements between said magazine and pad, a presser movable into and out of position to press the coated portion against said glue pad, and a blank supporting and holding plate alongside the gluing position of said pad, said second mentioned means including means adapted to cause said pad to make a movement relative to said plate and in a direction away from said magazine.

48. In an apparatus of the character described, in combination, a rotatable conical former, and a presser having teeth adapted resiliently to cooperate to press a blank against said former to coil the blank into a conical cup.

49. In an apparatus of the character described, in combination, a rotatable conical former, and a presser adapted to resiliently cooperate along an element of said former to the apex of the latter to press a blank toward said former, said presser including a plate having resilient teeth extending transversely of the axis of said former.

50. In an apparatus of the character described, in combination, a rotatable conical former, and a presser having a flexible resilient engaging surface adapted to cooperate along an element of said former to the apex of the latter to press a blank toward said former, said former including one or more pneumatic gripper openings the edges of which lie in the surface of said former.

51. In an apparatus of the character described, in combination, a rotatable conical former, and a presser having a flexible resilient engaging surface adapted to cooperate along an element of said former to the apex of the latter to press a blank toward said former, said former including one or more pneumatic gripper openings the edges of which lie in the surface of said former along an element of said former.

52. In an apparatus of the character described, in combination, a rotatable conical former, and a presser having a flexible engaging edge adapted to resiliently cooperate along an element of said former to the apex of the latter to press a blank toward said former, said presser including a plate having resilient teeth extending transversely of the axis of said former, said former including one or more pneumatic gripper openings lying along an element thereof.

53. In an apparatus of the character described, in combination, a rotatable conical former having one or more pneumatic gripper openings in its outer surface, and an independent atmospheric opening in said surface.

54. An apparatus of the character described including, in combination, a former having a curved face, and means adapted to cooperate with said former to coil a blank thereon including means to rotate said former and a stationary resiliently acting blank pressing surface lying substantially tangent to the curved face of said former as it is rotated.

55. In an apparatus of the character described, in combination, a former mounted for rotation and for translation from one station to another in an arcuate path, means to lock said former against rotation at one of said stations and during translation to said other station, means to affix a blank to said former at the first station, and a presser adjacent said other station adapted to partly coil the affixed blank on said former while said former is locked against rotation.

56. In an apparatus of the character described, in combination, a former mounted for rotation and for translation from one station to another in an arcuate path, means to lock said former against rotation at one of said stations and during translation to said other station, means to affix a blank to said former at the first station, a presser adjacent said other station adapted to partly coil the affixed blank on said former while said former is locked against rotation, and means adapted to cooperate to rotate said former to complete the coiling of said blank.

57. In an apparatus of the character described, in combination, a former mounted for rotation and for translation from one station to another in an arcuate path, means to lock said former against rotation at one of said stations and during translation to said other station, means to affix a blank to to said former at the first station, a presser adjacent said other station adapted to partly coil the affixed blank on said former while said former is locked against rotation, means adapted to cooperate to rotate said former to complete the coiling of said blank including a former-rotating mechanism, and means adapted automatically to operatively connect and disconnect said former and former-rotating mechanism.

58. In an apparatus of the character described, in combination, a former mounted for rotation and for translation from one station to another in an arcuate path, means to lock said former against rotation at one of said stations and during translation to said other station, means to affix a blank to said former at the first station, a presser adjacent said other station adapted to partly coil the affixed blank on said former while said former is locked against rotation, means adapted to cooperate to rotate said former to complete the coiling of said blank including a former-rotating mechanism, and means adapted automatically to operatively connect and disconnect said former and former-rotating mechanism including a former-unlocking device carried by said connecting and disconnecting means.

59. In an apparatus of the character described, in combination, a former mounted for rotation and for translation from one station to another in an arcuate path, means to lock said former against rotation at one of said stations and during translation to said other station, means to affix a blank to said former at the first station, a presser adjacent said other station adapted to partly coil the affixed blank on said former while said former is locked against rotation, means adapted to cooperate to rotate said former to complete the coiling of said blank including a former-rotating mechanism, and means adapted automatically to operatively connect and disconnect said former and former-rotating mechanism, said affixing means including one or more pneumatic gripper openings in said former.

60. In an apparatus of the character described, in combination, a former mounted for rotation and for translation from one station to another in an arcuate path, means to lock said former against rotation at one of said stations and during translation to said other station, means to affix a blank to said former at the first station, a presser adjacent said other station adapted to partly coil the affixed blank on said former while said former is locked against rotation, means adapted to cooperate to rotate said former to complete the coiling of said blank including a former-rotating mechanism, means adapted automatically to operatively connect and disconnect said former and former-rotating mechanism, said affixing means including one or more pneumatic gripper openings in said former, an exhaust device, and a valve adapted to automatically control the energizing and de-energizing of said gripper openings.

61. In an apparatus of the character described, in combination, an intermittently rotatable head, a plurality of conical formers rotatably mounted on said head, a blank magazine including a plurality of blank supporting fingers movable toward and from the surface of one of said formers at a station of rest, means adapted to strip the blanks one by one from said magazine including a glue pad adapted to adhere to a portion of an end blank in said magazine, means adapted to cause receding movement between said glue pad and said magazine while said glue pad adheres to said end blank, a blank gripper separate from said former and between which and said magazine there are approaching and receding movements, adapted to cooperate to draw another portion of said end blank from said magazine, each of said formers including one or more pneumatic gripper openings along its length adapted to be energized to grip said end blank when at said station of rest.

62. In an apparatus of the character described, in combination, an intermittently rotatable head, a plurality of conical formers rotatably mounted on said head, a blank magazine including a plurality of blank supporting fingers movable toward and from the surface of one of said formers at a station of rest, means adapted to strip the blanks one by one from said magazine including a glue pad adapted to adhere to a portion of an end blank in said magazine, means adapted to cause receding movement between said glue pad and said magazine while said glue pad adheres to said end blank, a blank gripper separate from said former and between which and said magazine there are approaching and receding movements, adapted to cooperate to draw another portion of said end blank from said magazine, each of said formers including one or more pneumatic gripper openings along its length adapted to be energized to grip said end blank when at said station of rest, a presser adjacent another station of rest adapted to cooperate with the formers respectively to effect the coiling of the blanks on said formers, and means adapted to rotate said formers at said last mentioned station of rest.

63. In an apparatus of the character described, in combination, an intermittently rotatable head, a plurality of conical formers rotatably mounted on said head, a blank magazine including a plurality of blank supporting fingers movable toward and from the surface of one of said formers at a station of rest, means adapted to strip the blanks one by one from said magazine including a glue pad adapted to adhere to a portion of an end blank in said magazine, means adapted to cause receding movement between said glue pad and said magazine while said glue pad adheres to said end blank, a plate movable into and out of position cooperative to press the glued blank against said pad, a blank gripper, separate from said former and between which and said magazine there are approaching and receding movements adapted to cooperate to draw another portion of said end blank from said magazine, each of said formers including one or more pneumatic gripper openings along its length adapted to be energized to grip said end blank when at said station of rest, a presser adjacent another station of rest adapted to cooperate with the formers respectively to effect the coiling of the blanks on said formers, and means adapted to rotate said formers at said last mentioned station of rest.

64. In an apparatus of the character described, in combination, an intermittently rotatable head, a plurality of conical formers rotatably mounted on said head, a blank magazine including a plurality of blank supporting fingers movable toward and from the surface of one of said formers at a station of rest, means adapted to strip the blanks one by one from said magazine including a glue pad adapted to adhere to a portion of an end blank in said magazine, means adapted to cause receding movement between said glue pad and said magazine while said glue pad adheres to said end blank, a plate movable into and out of position cooperative to press the glued blank against said pad, a blank gripper including one or more pneumatic gripper openings separate from said former and between which and said magazine there are approaching and receding movements adapted to cooperate to draw another portion of said end blank from said magazine, each of said formers including one or more pneumatic gripper openings along its length adapted to be energized to grip said end blank when at said station of rest, a presser adjacent another station of rest adapted to cooperate with the formers respectively to effect the coiling of the blanks on said formers, and means adapted to rotate said formers at said last mentioned station of rest.

65. In an apparatus of the character described, in combination, a plurality of rotatable formers translatable from station to station, means adapted to affix blanks to said formers at one of said stations, means adapted to rotate said formers at another of said stations, and means adapted automatically to operatively connect and disconnect said former rotating means and said formers at said last mentioned station.

66. In an apparatus of the character described, in combination, a plurality of rotatable formers translatable from station to station, means adapted to affix blanks to said formers at one of said stations, means adapted to rotate said formers at another of said stations, and means adapted automatically to operatively connect and disconnect said former rotating means and said formers at said last mentioned station including a driving and a driven pinion, an arm on which said driving pinion is mounted, and means to oscillate said arm to cause said pinions to mesh and unmesh.

67. In an apparatus of the character described, in combination, a plurality of rotatable formers translatable from station to station, means adapted to affix blanks to said formers at one of said stations, means adapted to rotate said formers at another of said stations, and means adapted automatically to operatively connect and disconnect said former rotating means and said formers at said last mentioned station including a driving and a driven pinion, an arm on which said driving pinion is mounted, and means to oscillate said arm to cause said pinions to mesh and unmesh including a rock-arm operatively connected to said oscillatable arm and a cam to operate said rock-arm in one direction.

68. In an apparatus of the character described, in combination, a plurality of rotatable formers translatable from station to station, means adapted to affix blanks to said formers at one of said stations, pawls translatable with said formers for locking them against rotation at times, means adapted to rotate said formers at another of said stations, means adapted automatically to operatively connect and disconnect said former rotating means and said formers at said last mentioned station including a driving and a driven pinion, an arm on which said driving pinion is mounted, and means to oscillate said arm to cause said pinions to mesh and unmesh, and means carried by said arm adapted to remove said pawls from locking position.

69. In an apparatus of the character described, in combination, a plurality of rotatable formers translatable from station to station, means adapted to affix blanks to said formers at one of said stations, means adapted to rotate said formers at another of said stations, means adapted automatically to operatively connect and disconnect said former rotating means and said formers at said last mentioned station including a driving and a driven pinion, an arm on which said driving pinion is mounted, and means to oscillate said arm to cause said pinions to mesh and unmesh, means adapted to rotate said driving pinion at intervals including a mutilated gear, and mechanism carried by said arm adapted to operate said driving pinion from said gear.

70. In an apparatus of the character described, in combination, a plurality of rotatable formers translatable from station to station, means adapted to affix blanks to said formers at one of said stations, pawls translatable with said formers for locking them against rotation at times, means adapted to rotate said formers at another of said stations, means adapted automatically to operatively connect and disconnect said former rotating means and said formers at said last mentioned station including a driving and a driven pinion, an arm on which said driving pinion is mounted, means to oscillate said arm to cause said pinions to mesh and unmesh including a rock-arm operatively connected to said oscillatable arm, a cam to operate said rock-arm in one direction, and means carried by said arm adapted to remove said pawls from locking position.

71. In an apparatus of the character described, in combination, a plurality of rotatable formers translatable from station to station, means adapted to affix blanks to said formers at one of said stations, pawls translatable with said formers for locking them against rotation at times, means adapted to rotate said formers at another of said stations, means adapted automatically to operatively connect and disconnect said former rotating means and said formers at said last mentioned station including a driving and a driven pinion, an arm on which said driving pinion is mounted, means to oscillate said arm to cause said pinions to mesh and unmesh including a rock-arm operatively connected to said oscillatable arm, a cam to operate said rock-arm in one direction, means carried by said arm adapted to remove said pawls from locking position, means adapted to rotate said driving pinion at intervals including a mutilated gear, and mechanism carried by said arm adapted to operate said driving pinion from said gear.

72. In an apparatus of the character described, in combination, a magazine for superposed blanks, a gluer and a suction head cooperating to grasp and remove a blank, and controlled to operate in sequence.

73. In an apparatus of the character described, in combination, a magazine for superposed blanks, a gluer and a suction head cooperating to grasp and remove a blank, and controlled to operate in sequence and means to impart movement to the magazine when the blank is grasped.

74. In an apparatus of the character described, in combination, a magazine for blanks, and means for feeding blanks including a plurality of grasping means engageable substantially simultaneously with a blank and controlled to operate in sequence.

75. In an apparatus of the character described, in combination, a magazine for blanks, and means for feeding blanks, including a plurality of means for substantially simultaneously grasping the face of the blank at opposite sides thereof and controlled to operate in sequence in the removal of the blank from said magazine.

76. In an apparatus of the character described, in combination, a magazine for blanks, and means for feeding the blanks, including means for preliminarily separating the edge of the blank to be fed from the remaining blanks and for simultaneously applying glue to the said edge, and means for moving said magazine and last named means relative to each other, whereby to remove said blank from said magazine.

77. In an apparatus of the character described, in combination, a carrier for blanks, a suction head for removing a blank, a gluer for gluing a portion of the blank, and means for controlling the gluer, and the suction head to operate in sequence.

78. In an apparatus of the character described, in combination, a carrier for blanks, a plurality of means for engaging the face of a blank, means for imparting relative movement to the carrier and to the engaging means, and means to impart relative movement to the engaging means with respect to each other prior to the relative movement of the said means and the carrier.

79. In an apparatus of the character described, in combination, a carrier for blanks, a plurality of means for engaging the face of blank, means for imparting relative movement to the carrier and to the engaging means, and means to impart relative movement to the engaging means with respect to each other prior to the relative movement of the said means and the carrier, one of said engaging means being a glue applier.

80. In an apparatus of the character described, in combination, a carrier for blanks, a plurality of means for engaging the face of a blank, means for imparting relative movement to the carrier and to the engaging means, means to impart relative movement to the engaging means with respect to each other prior to the relative movement of the said means and the carrier, one of said engaging means being a gluer, and means for afterwards pressing the blank against the gluer.

81. In an apparatus of the character described, in combination, a carrier for blanks, a suction head and a gluer cooperating to remove a blank and to simultaneously glue a portion of the blank, means for moving the carrier away from the head and the gluer after a blank has been grasped thereby, and means for imparting relative movement to the gluer and the suction head prior to the movement of the carrier.

82. In an apparatus of the character described, in combination, a rotatable former and a presser cooperating with an element thereof to assist in forming an article thereon, said presser having a flexible resilient engaging edge.

83. In an apparatus of the character described, in combination, a rotatable former and a presser cooperating with an element thereof to assist in forming an article thereon, said presser having an engaging edge composed of independent resilient fingers.

84. In an apparatus of the character described, in combination, a rotatable former and a presser cooperating with an element thereof to assist in forming an article thereon, said presser having an engaging edge composed of independent resilient fingers, and movable relative to the former.

85. In an apparatus of the character described, in combination, a rotatable former and a presser cooperating with an element thereof to assist in forming an article thereon, said presser engaging the article at a plurality of independent points.

86. In an apparatus of the character described, in combination, a rotatable former and a presser cooperating with an element thereof to assist in forming an article thereon, said presser engaging the article at a plurality of independent points, and movable relative to the former.

87. In an apparatus of the character described, in combination, a mandrel, means for feeding a blank to the mandrel, means in connection with the mandrel for grasping on edge of the blank, means to rotate the mandrel, means to translate the mandrel, and means for exercising a continuing pressure on the blank while the mandrel is rotated.

88. In an apparatus of the character described, in combination, a mandrel having gripping means for gripping the edge of a blank, a resilient presser for engaging said edge at a plurality of independent points, and means to rotate the blank while it is so engaged.

89. In an apparatus of the character described, in combination, a former adapted to support a cup in telescopic relation therewith, a cup carrier, including a pneumatic gripper opening, movable toward and from position in which said opening closely fits against the surface of a cup on the former, and means adapted to energize and deenergize said opening at predetermined times.

90. In an apparatus of the character described, in combination, a former adapted to support a cup in telescopic relation therewith, a cup carrier, including a pneumatic gripper opening, movable toward and from position in which said opening closely fits against the surface of a cup on the former, means adapted to energize and deenergize said opening at predetermined times, a cup pusher, and means adapted to operate said pusher to eject a cup from said carrier at a predetermined time.

91. In an apparatus of the character described, in combination, a former adapted to support a cup in telescopic relation therewith, a cup carrier, including a pneumatic gripper opening, movable toward and from position in which said opening closely fits against the surface of a cup on the former, and means adapted to energize and deenergize said opening at predetermined times, a cup counter, counter-actuating means, a trip movable with said carrier, adapted to assume positions in and out of operative relation to said counter-actuating means, and means, responsive to the energizing of said opening, adapted to move said trip into position to operate said counter-actuating means.

92. An apparatus of the character described including, in combination, a conical former terminating in a point, and means adapted to cooperate with said former to coil a blank thereon, including means to rotate said former on its longitudinal axis and a series of resiliently acting blank pressing surfaces lying substantially tangent to the conical face of said former as it is rotated, one of said surfaces lying close to the terminal point of said former.

93. In an apparatus of the character described, in combination, a former adapted to support a cup in telescopic relation therewith, a cup carrier, including a pneumatic gripper opening, movable toward and from position in which said opening closely fits against the surface of a cup on the former, and means adapted to energize and de-energize said opening at predetermined times, said former having an atmospheric opening in the surface underlying the cup.

94. In an apparatus of the character described, in combination, a plurality of rotatable and translatable conical formers having pneumatic gripper openings, an air exhaust and intervening air conduits including a chamber adapted to communicate simultaneously with the pneumatic gripper openings of a plurality of said formers.

95. In an apparatus of the character described, in combination, a plurality of translatable arms having air channels, a plurality of conical formers carried by said arms and rotatable thereon, said formers having pneumatic gripper openings in communication with said air channels, an air exhaust, air conduits connecting said exhaust and said air channels and including an air chamber adapted to communicate simultaneously with the air channels in a plurality of said arms.

96. In an apparatus of the character described, in combination, a plurality of rotatable and translatable conical formers having pneumatic gripper openings, an air exhaust and intervening air conduits including an air chamber periodically operative simultaneously to cut off communication of said exhaust with the pneumatic gripper openings of one of said conical formers and to establish communication with the openings of another of said formers.

97. In an apparatus of the character described, in combination, a plurality of translatable arms carrying conical formers rotatable thereon, said formers having pneumatic gripper openings, air channels through said arms communicating with said gripper openings, an air exhaust and an oscillatory valve member adapted, simultaneously, to establish communication of said air exhaust with the air channels through one of said arms and to cut off communication with the air channel through another of said arms.

98. In an apparatus of the character described, in combination, a plurality of translatable and rotatable conical formers having pneumatic gripper openings, means for positioning a blank against the openings of one of said formers, means for discharging a cone from another of said formers, an air exhaust, air conduits leading from said gripper openings to said exhaust and including an air chamber communicating simultaneously with the openings in a plurality of said formers, an oscillatory valve adapted to cut off communication of said air chamber with the openings in the discharging former and to establish communication with the openings in the former against which a blank is being positioned, and means periodically operative to oscillate said valve.

99. In an apparatus of the character described, in combination, a rotatable head carrying a plurality of arms having air channels terminating in apertures in said head, a plurality of conical formers carried by said arms and rotatable thereon, said formers having pneumatic gripper openings in communication with said air channels, an oscillatory valve against said head having an air chamber adapted to register with a plurality of apertures in said head and having a part adapted to close one of said apertures and an air exhaust in communication with said air chamber.

100. In an apparatus of the character described, in combination, a head, means for intermittently rotating said head, a conical former carried by an arm of said head, means for locking said former in respect to said head, means for releasing said lock during a period of rest of said head, and means for rotating said former on said head upon release of said lock.

101. In an apparatus of the character described, in combination, a head, means for intermittently rotating said head, a conical former carried by an arm of said head, means for locking said former in respect to said head, and an arm periodically operative during a period of rest of said head to release said lock and to rotate said former on said head a plurality of times.

102. In an apparatus of the character described, in combination, a head, means for intermittently rotating said head, a plurality of formers rotatably carried by arms of said head, means for locking said formers in respect to said head, and a member periodically operative to release the lock of a single former during the period of rest of said head and to rotate said former on said head.

103. In an apparatus of the character described, in combination, a conical former, a reciprocatory blank magazine adapted to position a blank against said former in predetermined relationship thereto and in the plane of an element of said former and means for gripping said blank to said former including pneumatic gripper openings in the surface of said former.

104. In an apparatus of the character described, in combination, a conical former, a plate fixed adjacent said former in the plane of an element of said former and a reciprocating blank magazine adapted to position a blank against said plate and said former in predetermined relationship thereto.

105. In an apparatus of the character described, in combination, a conical former, a plate fixed adjacent said former in the plane of an element of said former, a reciprocatory blank magazine adapted to position a blank against said plate and said former in predetermined relationship thereto, and means for gripping said blank to said plate and said former.

106. In an apparatus of the character described, in combination, a conical former having pneumatic gripper openings, a plate fixed adjacent said former having a surface in the plane of said gripper openings and having apertures in said surface, an air exhaust, means for periodically establishing communication of said air exhaust with said gripper openings and with said apertures, and means for feeding a blank to said plate and said former.

107. In an apparatus of the character described, in combination, a translatable conical former, a plate fixed adjacent said former, at one of its periods of rest from translation having a surface in a plane of an element of said former and having apertures in said surface, an air exhaust, intervening air conduits, and a valve adapted periodically to establish and to cut off communication between said exhaust and said apertures.

108. In an apparatus of the character described, in combination a translatable conical former, a plate fixed adjacent said former at one of its periods of rest from translation, having apertures in its surface, an air exhaust and intervening air conduits including a valve adapted to allow communication between said air exhaust and said apertures during a period of rest from translation of said former and to break communication during translation of said former.

109. In an apparatus of the character described, in combination, a reciprocatory blank magazine having means for removably carrying a pack of blanks, a fixed plate adapted to grip the end blank of said pack and a glue pad adapted to lie adjacent said plate in the plane thereof and to grip a projecting portion of said end blank.

110. In an apparatus of the character described, in combination, a conical former, a blank supporting plate fixed in the plane of an element of said former, a reciprocatory glue pad, means adapted to position said glue pad adjacent and in the plane of said plate, a reciprocatory blank magazine adapted to apply a blank against said former said plate and said glue pad in predetermined relationship thereto, means adapted to cause a slight receding movement of said glue pad in respect to said plate and means for removing said pad from contact with said blank held by said plate.

111. In an apparatus of the character described, in combination, a conical former having pneumatic gripper openings, a stationary blank supporting plate having pneumatic gripper openings in the plane of an element of said former, a glue pad, means to position said glue pad flush with said plate, a reciprocatory blank magazine adapted to position a blank against said former, said plate and said glue pad, and means including said pad, for retaining a single blank upon retraction of said blank magazine and including pneumatic gripper openings in said former and said plate.

112. In an apparatus of the character described, in combination, a plurality of intermittently translatable conical formers having pneumatic gripper openings, means for applying an edge of a substantially sector shaped blank to a former over said gripper openings at one station of rest from translation, a presser adjacent another station and means for rotating said former at said second station whereby said blank is coiled about said former to form a cone.

113. In an apparatus of the character described, in combination, a plurality of intermittently translatable conical formers, means for positioning a pack of substantially sector shaped blanks adjacent said formers at one station of rest from translation so that an edge of the end blank of the pack rests against said former, means for applying glue to a portion of said end blank while assembled in the pack, means adapted to grip said end blank to said former, a presser adjacent another station and means for rotating said former at said second station whereby said blank is coiled about said former to form a cone.

114. In an apparatus of the character described, in combination, a plurality of intermittently translatable conical formers having pneumatic gripper openings, means for positioning a pack of substantially sector shaped blanks adjacent said formers at one station of rest from translation so that an edge of the end blank of the pack rests against said gripper openings, means for applying glue to a portion of said end blank while assembled in the pack, means adapted to energize said gripper openings, a presser adjacent another station and means for rotating said former at said second station whereby said blank is coiled about said former to form a cone.

115. In an apparatus of the character described, in combination, a conical former, means for intermittently translating said former in an endless path, means for rotating said former, a plurality of times during a period of rest from translation, means for gripping a blank to said former, and a presser adapted to cooperate along an element of said former to press said gripped blank resiliently toward said former during rotation thereof.

116. In an apparatus of the character described, in combination, a conical former, means for intermittently translating said former in an endless path, means for gripping a blank to said former, means for rotating said former during a period of rest from translation whereby said blank is coiled around said former to form a cone, and a plurality of brushes adapted to press said cone against said former during a substantial portion of translation of said former.

117. In an apparatus of the character described, in combination, a rotatable and translatable conical former, means for coiling a blank about said former to form a cone, means for pneumatically gripping said cone to said former, means for periodically releasing said grip, a carrier adapted to grip said cone upon said release and to withdraw said cone from said former, and means for discharging said cone from said carrier.

118. In an apparatus of the character described, in combination, a plurality of rotatable and translatable conical formers, means for coiling in sequence blanks about said formers to form cones, a receiver, means for discharging in sequence said cones from said formers to said receiver and means automatically operative periodically to discharge a predetermined plurality of cones from said receiver.

119. In an apparatus of the character described, in combination, a plurality of rotatable conical formers intermittently translatable in an endless path, means for feeding a blank to a former at one station of rest from translation, means for rotating a former at another station, means for pressing said blank against said former during rotation thereof to form a cone, and means for discharging the cone from said former at another station.

120. In an apparatus of the character described, in combination, a plurality of rotatable conical formers intermittently translatable in an endless path, means for feeding a blank to a former at one station of rest from translation, means for gripping said blank to said former, means for rotating a former at another station, means for pressing said blank against said former during rotation thereof, whereby said blank is coiled about said former to form a cone, and means for discharging the cone from said former at another station.

121. In an apparatus of the character described, in combination, a plurality of rotatable conical formers intermittently translatable in an endless path, means for feeding a blank to a former at one station of rest from translation, means for gripping said blank to said former, means for applying glue to a portion of said blank, means for rotating said former at another station, means for pressing said blank against said former during rotation thereof, whereby said blank is coiled about said former to form a cone, and means for discharging said cone from said former at another station.

122. In an apparatus of the character described, in combination, a plurality of rotatable conical formers intermittently translatable in an endless path, means for feeding a blank to a former at one station of rest from translation, means for gripping said blank to said former, means for applying glue to a portion of said blank, means including former rotating mechanism adapted to coil said blank about said former to form a cone, means for pressing said cone against said former during a period of translation of said former, and means for discharging said cone from said former at another station.

123. In an apparatus of the character described, in combination, a plurality of rotatable conical formers intermittently translatable in an endless path, means for stripping a blank from a pack and applying said blank to a former in predetermined relationship thereto at one of the stations of rest from translation, means for gripping said blank to said former, means for applying glue to a portion of said blank, means for rotating said former a plurality of times at a second station of rest, means for pressing said blank against said former during rotation thereof, means for ironing the cone so formed during translation of said former from the second station of rest to a point beyond the third station of rest, means for releasing said gripping means at a fourth station of rest, and means for discharging said cone from said former.

124. In an apparatus of the character described, in combination, a plurality of rotatable conical formers intermittently translatable in an endless path, means for applying a substantially sector shaped blank to a former at one of the stations of rest from translation so that the center of the sector will lie at the apex of said former, means for gripping said blank to said former, means for applying and spreading glue over a portion of said blank along a radius thereof, means for rotating said former a plurality of times at a second station of rest, means for pressing said blank against said former during rotation thereof, means for ironing the cone so formed during translation of said former from the second station of rest to a point beyond the third station of rest, means for releasing the gripping means at a fourth station of rest, and means for discharging said cone from said former.

125. In an apparatus of the character described, in combination, a head, means for intermittently rotating said head, a plurality of formers, carried by said head, means for normally locking said formers in non-rotative relationship to said head, means for stripping a blank from a pack and applying said blank to a former in predetermined relationship thereto at one of the stations of rest of said head, means for gripping said blank to said former, means for applying glue to a portion of said blank, means for releasing said locking means and for rotating said former a plurality of times at a second station of rest of said head, means for pressing said blank against said former during rotation thereof, means for ironing the cone so formed from the second station of rest of said head to a point beyond the third station, means for releasing said gripping means at a fourth station and means for discharging said cone from said former.

126. In an apparatus of the character described, in combination, a head, means for intermittently rotating said head, a plurality of formers carried by said head, means for normally locking said formers in non-rotative relationship to said head, means for stripping a blank from a pack and applying said blank to a former in predetermined relationship thereto at one of the stations of rest to said head, means for gripping said blank to said former, means for applying glue to a portion of said blank, means for releasing said locking means and for rotating said former a plurality of times at a second station of rest of said head, means for pressing said blank against said former during rotation thereof, means for ironing the cone so formed from the second station of rest of said head to a point beyond the third station, means for releasing said gripping means at a fourth station, means for discharging said cone from said former, and means for automatically removing the discharged cones periodically upon discharge of a predetermined number of cones.

127. In apparatus of the character described, in combination, a translatable, rotatable conical former having gripping means arranged along an element thereof, means adapted to feed a blank so that an edge thereof is engaged by the gripping means, means for applying glue to a portion of said end blank during the feeding thereof, means adapted to energize said gripper openings, a presser adjacent another station and means for rotating said former at said second station whereby said blank is coiled about said former to form a cone.

128. In an apparatus of the character described, in combination, a plurality of rotatable and translatable conical formers, means for feeding in sequence substantially sector shaped blanks to said formers, means in connection with the feeding means for applying glue to said blanks over a substantially triangular area along an edge of each of said blanks, the base of the triangle lying adjacent the center of the sector, and means for coiling said blanks about said formers to form cones.

129. In an apparatus of the character described, in combination, a former, means for feeding a blank to said former, means for coiling said blank about said former to provide a cone and means acting prior to the coiling of the blank for applying glue to the marginal portion thereof along the joint of the cone, and over an area adjacent the vertex thereof so that when the blank is coiled, the said area will encircle the vertex.

130. In an apparatus of the character described, in combination, a plurality of rotatable and translatable conical formers, means for feeding in sequence substantially sector shaped blanks to said formers, means for coiling said blanks about said formers to form cones, and means for applying a line of glue along the edge of the blank and of a width at the apex such that when the blank is coiled the glued area will encircle the cone.

131. In an apparatus of the character described, in combination, a plurality of rotatable and translatable conical formers, means for feeding in sequence substantially sector shaped blanks having projecting tabs to said formers, means for applying glue to a predetermined portion of said blanks including said tabs and means for coiling said blanks about said formers into cones having more than one ply of material adjacent their apices.

132. In apparatus of the character described, in combination, a former, means adapted to apply a single blank in predetermined relationship to said former, means adapted to apply glue to a portion of said blank along an edge thereof, means adapted to coil said blank about said former to form a cone having a tightly closed apex, a presser having a flexible and resilient edge to engage and press said cone to seal said cone and means for discharging said cone from said former.

133. In apparatus of the character described, in combination, blank-feeding mechanism, blank gluing mechanism, a plurality of formers adapted to receive in sequence a single substantially sector shaped blank, means adapted to coil the glued blank about a former to form a cone having a closed apex, means adapted subsequently to press said cone against said former to seal said cone and means for discharging said cone from said former.

134. In an apparatus of the character described, in combination, a conical former, a magazine including means for supporting a pack of blanks, a reciprocal magazine carrier adapted to move said magazine to apply an end blank of the pack against an element of said former and to remove the pack from said former, a loose connection between said magazine and said magazine carrier, and means for effecting initial relative motion of said magazine in respect to said magazine carrier as said magazine recedes from the former in a direction perpendicular to the element of said former adjacent which said blank rests.

135. In an apparatus of the character described, in combination, a conical former having a plurality of pneumatic gripper openings, a magazine including means for supporting a pack of blanks, a reciprocal magazine carrier adapted to move said magazine to apply an end blank of the pack against said gripper openings of said former and to remove the pack from said former, pivotal connection between said magazine and said magazine carrier, and means for effecting initial pivotal motion of said magazine in respect to said magazine carrier as said magazine carrier recedes from said former.

136. In an apparatus of the character described, in combination, a conical former, a reciprocal blank magazine adapted to deliver a blank to said former against an element thereof and adapted subsequently to recede from said former, and means adapted to direct the initial recessional movement in a path normal to the element of said former adjacent which said delivered blank rests.

137. In an apparatus of the character described, in combination, a supporting plate including one or more pneumatic gripper openings adapted to hold a blank on said plate, a magazine including a plurality of fingers adapted to support a pack of blanks therebetween, a reciprocal magazine carrier for moving said magazine to apply to and remove the pack from said plate, and means for directing the initial removing motion of said magazine in a pivotal path substantially normal to said plate.

138. An apparatus of the character described including, in combination, a conical former terminating in a point and having one or more pneumatic gripper openings in its conical face, means adapted to translate said former from station to station, a stationary presser at one station adapted to cooperate with the former to press an intermediate blank against the conical face of the former close to the terminal point of the former, means adapted to rotate said former when in cooperative pressing relation to said presser to coil the blank on the former, and means adapted to energize and deenergize said pneumatic gripper opening or openings at predetermined times.

139. An apparatus of the character described including, in combination, a conical former terminating in a point and having one or more pneumatic gripper openings in its conical face, means adapted to translate said former from station to station, a presser at one station adapted to cooperate with the former resiliently to press an intermediate blank against the conical face of the former close to the terminal point of the former, means adapted to rotate said former when in cooperative pressing relation to said presser to coil the blank on the former, and means adapted to energize and deenergize said pneumatic gripper opening or openings at predetermined times.

140. An apparatus of the character described including, in combination, a conical former terminating in a point and having one or more pneumatic gripper openings in its conical face, means adapted to translate said former from station to station, a stationary presser at one station adapted to cooperate with the former resiliently to press an intermediate blank against the conical face of the former close to the terminal point of the former, means adapted to rotate said former when in cooperative pressing relation to said presser to coil the blank on the former, and means adapted to energize and deenergize said pneumatic gripper opening or openings at predetermined times.

141. An apparatus of the character described including, in combination, a conical former terminating in a point and having one or more pneumatic gripper openings in its conical face, means adapted to translate said former from station to station, a plurality of resiliently acting pressing members at one station adapted to cooperate with the former to press an intermediate blank against the conical face of the former at different points longitudinally of the former and at a point close to the terminal point of the former, means adapted to rotate said former when in cooperative pressing relation to said pressing members to coil the blank on the former, and means adapted to energize and deenergize said pneumatic gripper opening or openings at predetermined times.

142. An apparatus of the character described including, in combination, a former having one or more pneumatic gripper openings in its face, means adapted to translate said former station to station, a blank supporting plate adjacent one of said stations having one or more pneumatic gripper openings in its supporting face, a blank magazine reciprocal normally to said plate adapted to apply the end blank of the pack on said plate and the former at the same station over pneumatic gripper openings in each and so that a margin of the pack extends beyond an edge of said plate, blank gluing means including a glue pad reciprocal normally to said plate toward and from said margin adapted to apply glue to said end blank, means adapted to energize and deenergize the pneumatic gripper openings in said former and said supporting plate at predetermined times, means adapted to coordinate the movements of said magazine and said pad relative to each other and to the translating movement of said former and the periods of energizing and deenergizing of said gripper openings to cause the end blank of said pack to be glued by said pad, pneumatically gripped to said supporting plate and said former, stripped from said pack and translated by said former to another station.

143. An apparatus of the character described including, in combination, a former having one or more pneumatic gripper openings in its face, means adapted to translate said former from station to station, a blank supporting plate adjacent one of said stations having one or more pneumatic gripper openings in its supporting face, a blank magazine reciprocal normally to said plate adapted to apply the end blank of the pack on said plate and the former at the same station over pneumatic gripper openings in each and so that a margin of the pack extends beyond an edge of said plate, blank gluing means including a glue pad reciprocal normally to said plate toward and from said margin adapted to apply glue to said end blank, a plate movable to cooperate with said glue pad to press the glued area of the blank therebetween to distribute the glue on said blank, means adapted to energize and deenergize the pneumatic gripper openings in said former and said supporting plate at predetermined times, means adapted to coordinate the movements of said magazine, said distributing plate, and said pad relative to each other and to the translating movement of said former and the periods of energizing and deenergizing of said gripper openings to cause the end blank of said pack to be glued by said pad, pneumatically gripped to said supporting plate and said former, stripped from said pack and translated by said former to another station.

144. An apparatus of the character described including, in combination, a conical former terminating in a point and having one or more pneumatic gripper openings in its conical face, means adapted to translate said former from station to station, a blank supporting plate adjacent one of said stations having one or more pneumatic gripper openings in its supporting face, a blank magazine reciprocal normally to said plate adapted to apply the end blank of the pack on said plate and the former at the same station over pneumatic gripper openings in each and so that a margin of the pack extends beyond an edge of said plate, blank gluing means including a glue pad reciprocal normally to said plate toward and from said margin adapted to apply glue to said end blank, means adapted to energize and deenergize the pneumatic gripper openings in said former and said supporting plate at predetermined times, means adapted to coordinate the movements of said magazine and said pad relative to each other and to the translating movement of said former and the periods of energizing and deenergizing of said gripper openings to cause the end blank of said pack to be glued by said pad, pneumatically gripped to said supporting plate and said former, stripped from said pack and translated by said former to another station, a plurality of resiliently acting pressing members at said other station adapted to cooperate with said former to press the gripped blank against the conical face of the former at different points longitudinally of the former and at a point close to the terminal point of the former, and means adapted to rotate said former when in cooperative pressing relation to said pressing members.

145. An apparatus of the character described including, in combination, a conical former terminating in a point and having one or more pneumatic gripper openings in its conical face, means adapted to translate said former from station to station, a blank supporting plate adjacent one of said stations having one or more pneumatic gripper openings in its supporting face, a blank magazine reciprocal normally to said plate adapted to apply the end blank of the pack on said plate and the former at the same station over pneumatic gripper openings in each and so that a margin of the pack extends beyond an edge of said plate, blank gluing means including a glue pad reciprocal normally to said plate toward and from said margin adapted to apply glue to said end blank, means adapted to energize and deenergize the pneumatic gripper openings in said former and said supporting plate at predetermined times, means adapted to coordinate the movements of said magazine and said pad relative to each other and to the translating movement of said former and the periods of energizing and deenergizing of said gripper openings to cause the end blank of said pack to be glued by said pad, pneumatically gripped to said supporting plate and said former, stripped from said pack and translated by said former to another station, a plurality of resiliently acting pressing members at said other station adapted to cooperate with said former to press the gripped blank against the conical face of the former at different points longitudinally of the former and at a point close to the terminal point of the former, and means adapted to rotate said former when in cooperative pressing relation to said pressing members, said pressing members having pressing faces substantially tangent to the conical face of the former at said other station, said translating means including mechanism adapted to move said former to said other station in an arcuate path, and means adapted to lock said former from rotation on its longitudinal axis during said arcuate movement.

146. An apparatus of the character described including, in combination, a conical former terminating in a point and having one or more pneumatic gripper openings in its conical face, means adapted to translate said former from station to station, a blank supporting plate adjacent one of said stations having one or more pneumatic gripper openings in its supporting face, a blank magazine reciprocal normally to said plate adapted to apply the end blank of the pack on said plate and the former at the same station over pneumatic gripper openings in each and so that a margin of the pack extends beyond an edge of said plate, blank gluing means including a glue pad reciprocal normally to said plate toward and from said margin adapted to apply glue to said end blank, means adapted to energize and deenergize the pneumatic gripper openings in said former and said supporting plate at predetermined times, means adapted to coordinate the movements of said magazine and said pad relative to each other and to the translating movement of said former and the periods of energizing and deenergizing of said gripper openings to cause the end blank of said pack to be glued by said pad, pneumatically gripped to said supporting plate and said former, stripped from said pack and translated by said former to another station, a plurality of resiliently acting pressing members at said other station adapted to cooperate with said former to press the gripped blank against the conical face of the former at different points longitudinally of the former and at a point close to the terminal point of the former, and means adapted to rotate said former when in cooperative pressing relation to said pressing members, and means, including a curved brush in contact with which the coiled blank on said former passes in its translating movement, adapted to firmly wipe the glue adhering area of the coiled blank in the direction of coiling.

147. An apparatus of the character described including, in combination, a conical former terminating in a point and having one or more pneumatic gripper openings in its conical face, means adapted to translate said former from station to station, a blank supporting plate adjacent one of said stations having one or more pneumatic gripper openings in its supporting face, a blank magazine reciprocal normally to said plate adapted to apply the end blank of the pack on said plate and the former at the same station over pneumatic gripper openings in each and so that a margin of the pack extends beyond an edge of said plate, blank gluing means including a glue pad reciprocal normally to said plate toward and from said margin adapted to apply glue to said end blank, means adapted to energize and deenergize the pneumatic gripper openings in said former and said supporting plate at predetermined times, means adapted to coordinate the movements of said magazine and said pad relative to each other and to the translating movement of said former and the periods of energizing and deenergizing of said gripper openings to cause the end blank of said pack to be glued by said pad, pneumatically gripped to said supporting plate and said former, stripped from said pack and translated by said former to another station, a plurality of resiliently acting pressing members at said other station adapted to cooperate with said former to press the gripped blank against the conical face of the former at different points longitudinally of the former and at a point close to the terminal point of the former, means adapted to rotate said former when in cooperative pressing relation to said pressing members, a carrier movable longitudinally of the former and into and out of position closely opposite the conical face of the former at a third station, said carrier having pneumatic gripper openings for seizing the coiled blank on said former, and means for timing the energizing and deenergizing of said carrier openings relative to that of said former.

148. An apparatus of the character described including, in combination, a conical former terminating in a point and having one or more pneumatic gripper openings in its conical face, means adapted to translate said former from station to station, a blank supporting plate adjacent one of said stations having one or more pneumatic gripper openings in its supporting face, a blank magazine reciprocal normally to said plate adapted to apply the end blank of the pack on said plate and the former at the same station over pneumatic gripper openings in each and so that a margin of the pack extends beyond an edge of said plate, blank gluing means including a glue pad reciprocal normally to said plate toward and from said margin adapted to apply glue to said end blank, means adapted to energize and deenergize the pneumatic gripper openings in said former and said supporting plate at predetermined times, means adapted to coordinate the movements of said magazine and said pad relative to each other and to the translating movement of said former and the periods of energizing and deenergizing of said gripper openings to cause the end blank of said pack to be glued by said pad, pneumatically gripped to said supporting plate and said former, stripped from said pack and translated by said former to another station, a plurality of resiliently acting pressing members at said other station adapted to cooperate with said former to press the gripped blank against the conical face of the former at different points longitudinally of the former and at a point close to the terminal point of the former, means adapted to rotate said former when in cooperative pressing relation to said pressing members, a carrier movable longitudinally of the former and into and out of position closely opposite the conical face of the former at a third station, said carrier having pneumatic gripper openings for seizing the coiled blank on said former, and means for timing the energizing and deenergizing of said carrier openings relative to that of said former, a counter and means, dependent upon removal of a coiled blank from said former, for actuating said counter to count.

149. In an apparatus of the character described, in combination, a conical former terminating in a point and having one or more pneumatic gripper openings in its face, means adapted to apply a blank to said former in such position that a portion of the blank extends outside said former beyond said point and a portion overlies said opening or openings, means adapted to energize and deenergize said openings at predetermined times, means adapted to translate said former periodically to and from position where the blank is applied thereto, means adjacent the path of movement of said former adapted to cooperate with the former to coil on the latter the blank held by said openings including a plate having spring teeth, one of said teeth being disposed and adapted to lie closely opposite the conical face of said former closely adjacent its terminal point, and means adapted to rotate said former when in cooperative relation to said spring teeth.

150. An apparatus of the character described including, in combination, a former, and a series of resiliently acting blank pressing members adapted to cooperate to press a blank toward the former at different points.

151. An apparatus of the character described including, in combination, a conical former terminating in a point, and a series of resiliently acting blank pressing members adapted to cooperate to press a blank toward the former at different points including a member for pressing the blank against the former close to its terminal point.

152. An apparatus of the character described including, in combination, a conical former terminating in a point, and a member adapted resiliently to press a blank toward the former close to its terminal point.

153. An apparatus of the character dedescribed including, in combination, a conical former terminating in a point, and a blank presser adapted to lie close to the conical face of said former and having a portion projecting beyond the terminal point of said former toward the longitudinal axis of the former.

154. An apparatus of the character described including, in combination, a former, and means adapted to cooperate with said former to coil a blank thereon including a plate having a series of resilient teeth adapted to lie close to the shaping face of said former.

155. An apparatus of the character described including, in combination, a conical former terminating in a point, and means adapted to cooperate with said former to coil a blank thereon including a plate having a series of teeth adapted to lie close to the conical face of said former, one of said teeth adapted to lie close to the terminal point of said former.

156. In a machine for making conical cups from blanks of paper, a former having a conical surface terminating in a point and having one or more pneumatic gripper openings in said conical surface, toothed means for pressing a blank against the former, means adapted to rotate said former on its longitudinal axis, and means adapted to energize and deenergize said pneumatic gripper opening or openings at predetermined times.

157. In a machine for making conical cups from blanks of paper, a former having a conical surface terminating in a point and having a series of pneumatic gripper openings extending along an element of the conical surface, a toothed stationary presser coacting therewith, means adapted to rotate said former on its longitudinal axis, and means adapted to energize and deenergize said pneumatic gripper openings at predetermined times.

158. A machine for forming conical cups from blanks of paper comprising, in combination, a conical former terminating in a point and having pneumatic gripper openings in its conical face, translatable from station to station, a blank supporting plate, having pneumatic gripper openings, at one station, a blank magazine movab'e to apply the end blank to said former and said plate over the pneumatic gripper openings in each, means adapted to energize and deenergize said openings at predetermined intervals, a blank gluing pad reciprocal normally to the surface of said plate adapted to contact the end blank of the pack of blanks in the magazine, means adapted to actuate said gluing pad in timed relation to the movement of said magazine and to the periods of energization and deenergization of said openings, and means adapted to translate said former from station to station.

159. A machine for forming conical cups from blanks of paper comprising, in combination, a conical former terminating in a point and having pneumatic gripper openings in its conical face, translatable from station to station, a blank supporting plate, having pneumatic gripper openings, at one station, a blank magazine movable to apply the end blank to said former and said plate over the pneumatic gripper openings in each, means adapted to energize and deenergize said openings at predetermined intervals, a blank gluing pad reciprocal normally to the surface of said plate adapted to contact the end blank of the pack of blanks in the magazine, means adapted to actuate said gluing pad in timed relation to the movement of said magazine and to the periods of energization and deenergization of said openings, means adapted to translate said former from station to station, a presser plate toward which said former moves from the blank applying station, said presser plate having a portion, adapted to contact the gripped blank and press the same against the conical face of the former closely adjacent the point of the former, and means adapted to rotate said former when in cooperative relation to said presser plate.

160. A machine for forming conical cups from blanks of paper comprising, in combination, a conical former terminating in a point and having pneumatic gripper openings in its conical face, translatable from station to station, a blank supporting plate, having pneumatic gripper openings, at one station, a blank magazine movable to apply the end blank to said former and said plate over the pneumatic gripper openings in each, means adapted to energize and deenergize said openings at predetermined intervals, a blank gluing pad reciprocal normally to the surface of said plate adapted to contact the end blank of the pack of blanks in the magazine, means adapted to actuate said gluing pad in timed relation to the movement of said magazine and to the periods of energization and deenergization of said openings, means adapted to translate said former from station to station, a presser plate toward which said former moves from the blank applying station, said presser plate having a portion, adapted to contact the gripped blank and press the same against the conical face of the former closely adjacent the point of the former, means for effecting relative movement between said former and said presser plate to cause the latter to initially contact the blank behind the advance edge of the blank, and means adapted to rotate said former when in cooperative relation to said presser plate.

161. A machine for forming conical cups from blanks of paper comprising, in combination, a conical former terminating in a point and having pneumatic gripper openings in its conical face, translatable from station to station, means adapted to attach an advance edge of a blank to said former at one station, a blank presser plate at another and subsequent station, and means adapted to effect relative rotary movement between said former and said presser plate, in the direction adapted to coil the blank, prior to establishment of cooperative coiling and pressing relation between said former and presser plate.

162. A machine for forming conical cups from blanks of paper comprising, in combination, a rotatable turret head, a plurality of conical formers adapted to rotate on said head, each former having pneumatic gripper openings in its conical face, means adapted to rotate said head intermittently, a stationary plate, having pneumatic gripper openings, adjacent a station of rest of said formers, a resilient presser, at a different station of rest, adapted to cooperate with said formers, respectively, to coil blanks into conical cups, a reciprocal, pivotally supported, blank magazine movable simultaneously to apply the end blank to said plate and a former at the same station over the pneumatic gripper openings of each, a blank gluing pad, reciprocal normally to the surface of said plate, adapted to contact the end blank of the pack of blanks in the magazine, means to reciprocate said pad including mechanism to impart a dwell to the pad in its initial movement away from said pack, means adapted to rotate said formers on said head when in cooperative relation to said presser, means adapted to discharge cups from said formers at a station subsequent to the presser station, a cup pressing brush alongside the path of the formers between the pressing and the discharging station, and means adapted to lock said formers against rotation on said head while passing said brush and while at the blank receiving station.

163. An apparatus of the character described including, in combination, a plurality of conical formers, a cup receiving pan, and mechanism adapted to cooperate with said formers successively to feed blanks to, coil the blanks into cups thereon and discharge the cups from said formers into nested relation on said pan, said mechanism including a cup carrier movable to transport successive cups from said formers to said pan.

164. An apparatus of the character described including, in combination, a plurality of conical formers, a cup receiving pan, and mechanism adapted to cooperate with said formers successively to feed blanks to, coil the blanks into cups thereon and discharge the cups from said formers into nested relation on said pan, said mechanism including a cup carrier movable to transport successive cups from said formers to said pan, and a cup pusher adapted to contact the lip of a cup on the carrier and move the cup in the direction of previously discharged cups on said pan.

165. An apparatus of the character described including, in combination, a plurality of conical formers, a cup receiving pan, and mechanism adapted to cooperate with said formers successively to feed blanks to, coil the blanks into cups thereon and discharge the cups from said formers into nested relation on said pan, said mechanism including a cup carrier movable to transport successive cups from said formers to said pan, means adapted to tilt said pan to effect discharge of cups therefrom, and means whereby actuation of said tilting means is effected periodically in response to the transport of a predetermined number of cups by said carrier.

166. An apparatus of the character described including, in combination, a plurality of formers, mechanism adapted to cooperate with said formers successively to feed blanks to and coil the blanks on said formers, means to discharge the coiled blanks from the formers comprising a reciprocal carrier adapted to support a coiled blank and remove it from the former, a counting device, and means whereby counting actuation of said device is dependent upon removal of a coiled blank from a former by said carrier.

In testimony whereof I affix my signature.

HAROLD CARLE.